(12) United States Patent
Sakata et al.

(10) Patent No.: US 10,034,241 B2
(45) Date of Patent: Jul. 24, 2018

(54) WIRELESS COMMUNICATION DEVICE AND SYSTEM

(71) Applicant: KABUSHIKI KAISHA TOSHIBA, Tokyo (JP)

(72) Inventors: Ren Sakata, Kanagawa (JP); Hiroki Kudo, Kanagawa (JP)

(73) Assignee: Kabushiki Kaisha Toshiba, Tokyo (JP)

(*) Notice: Subject to any disclaimer, the term of this patent is extended or adjusted under 35 U.S.C. 154(b) by 66 days.

(21) Appl. No.: 14/879,271

(22) Filed: Oct. 9, 2015

(65) Prior Publication Data

US 2016/0262102 A1 Sep. 8, 2016

(30) Foreign Application Priority Data

Mar. 5, 2015 (JP) .................................. 2015-043460

(51) Int. Cl.
| | |
|---|---|
| *H04W 72/06* | (2009.01) |
| *H04W 52/02* | (2009.01) |
| *H04B 7/155* | (2006.01) |
| *H04L 5/16* | (2006.01) |
| *H04W 72/04* | (2009.01) |

(52) U.S. Cl.
CPC .... *H04W 52/0216* (2013.01); *H04B 7/15542* (2013.01); *H04L 5/16* (2013.01); *H04W 72/0446* (2013.01); *H04W 72/06* (2013.01); *Y02D 70/00* (2018.01); *Y02D 70/22* (2018.01); *Y02D 70/446* (2018.01)

(58) Field of Classification Search
CPC ............... H04W 40/22; H04W 40/246; H04W 52/0216; H04W 72/0446; H04L 41/0853; H04L 41/0893

USPC ........................................................ 370/279
See application file for complete search history.

(56) References Cited

U.S. PATENT DOCUMENTS

| | | | | |
|---|---|---|---|---|
| 6,704,572 | B1* | 3/2004 | Whinnett | H04W 16/04 370/431 |
| 7,336,625 | B2* | 2/2008 | Hertel | H04M 1/725 370/280 |
| 7,974,240 | B2 | 7/2011 | Liu et al. | |
| 8,175,025 | B2 | 5/2012 | Yanagihara | |
| 2004/0196838 | A1* | 10/2004 | Zadikian | H04J 14/0227 370/360 |
| 2004/0264495 | A1* | 12/2004 | Nandagopalan | H04L 12/2801 370/462 |

(Continued)

FOREIGN PATENT DOCUMENTS

| | | |
|---|---|---|
| JP | 2008-22558 | 1/2008 |
| JP | 2009-159429 | 7/2009 |

(Continued)

OTHER PUBLICATIONS

Sakata et al., U.S. Appl. No. 14/840,714, filed Aug. 31, 2015.

*Primary Examiner* — Edan Orgad
*Assistant Examiner* — Emmanuel Maglo
(74) *Attorney, Agent, or Firm* — Nixon & Vanderhye, P.C.

(57) ABSTRACT

A wireless communication device according to an embodiment includes a transceiver and a timer. The transceiver transmits and receives data and transmits the data in a first direction and a second direction. The timer determines a timing for the transceiver to transmit data such that a transmission interval in the first direction is longer than a transmission interval in the second direction.

16 Claims, 25 Drawing Sheets

(56) References Cited

U.S. PATENT DOCUMENTS

| | | | |
|---|---|---|---|
| 2009/0225686 A1* | 9/2009 | Haartsen | H04W 72/1263 |
| | | | 370/277 |
| 2010/0226342 A1* | 9/2010 | Colling | H04W 56/002 |
| | | | 370/336 |
| 2012/0320923 A1* | 12/2012 | Vasseur | H04W 40/22 |
| | | | 370/400 |
| 2013/0083722 A1* | 4/2013 | Bhargava | H04W 48/20 |
| | | | 370/315 |
| 2013/0121335 A1* | 5/2013 | Hui | H04L 12/18 |
| | | | 370/390 |
| 2014/0323037 A1 | 10/2014 | Mukami et al. | |
| 2016/0066319 A1 | 3/2016 | Sakata et al. | |

FOREIGN PATENT DOCUMENTS

| | | |
|---|---|---|
| JP | 2009-239778 | 10/2009 |
| JP | 2014-216796 | 11/2014 |
| JP | 2016-054349 | 4/2016 |

\* cited by examiner

US 10,034,241 B2

WIRELESS COMMUNICATION DEVICE AND SYSTEM

CROSS REFERENCE TO RELATED APPLICATION(S)

This application is based upon and claims the benefit of priority from the prior Japanese Patent Application No. 2015-043460, filed on Mar. 5, 2015, the entire contents of which are incorporated herein by reference.

FIELD

Embodiments described herein relate generally to a wireless communication system and system.

BACKGROUND

In the related art, wireless communication systems, where multiple wireless nodes are connected to each other in a mesh-like manner, are in use. As a communication scheme for such wireless communication systems, for example, a time division communication system is employed. In the time division communication system, timings for the respective wireless nodes to go to sleep can be easily controlled, and thus, the power of the wireless communication systems can be saved.

However, in the time division communication system of the related art, uplink and downlink transmission are performed at the same frequency. Due to this, when a transmission frequency required for uplink and that required for downlink are different, excessive data transmission is performed, thereby disadvantageously increasing power consumption.

DETAILED DESCRIPTION

Embodiments will now be explained with reference to the accompanying drawings. The present invention is not limited to the embodiments.

A wireless communication device according to an embodiment includes a transceiver and a timer. The transceiver transmits and receives data and transmits the data in a first direction and a second direction. The timer determines a timing for the transceiver to transmit data such that a transmission interval in the first direction is longer than a transmission interval in the second direction.

(First Embodiment)

Figure 1:
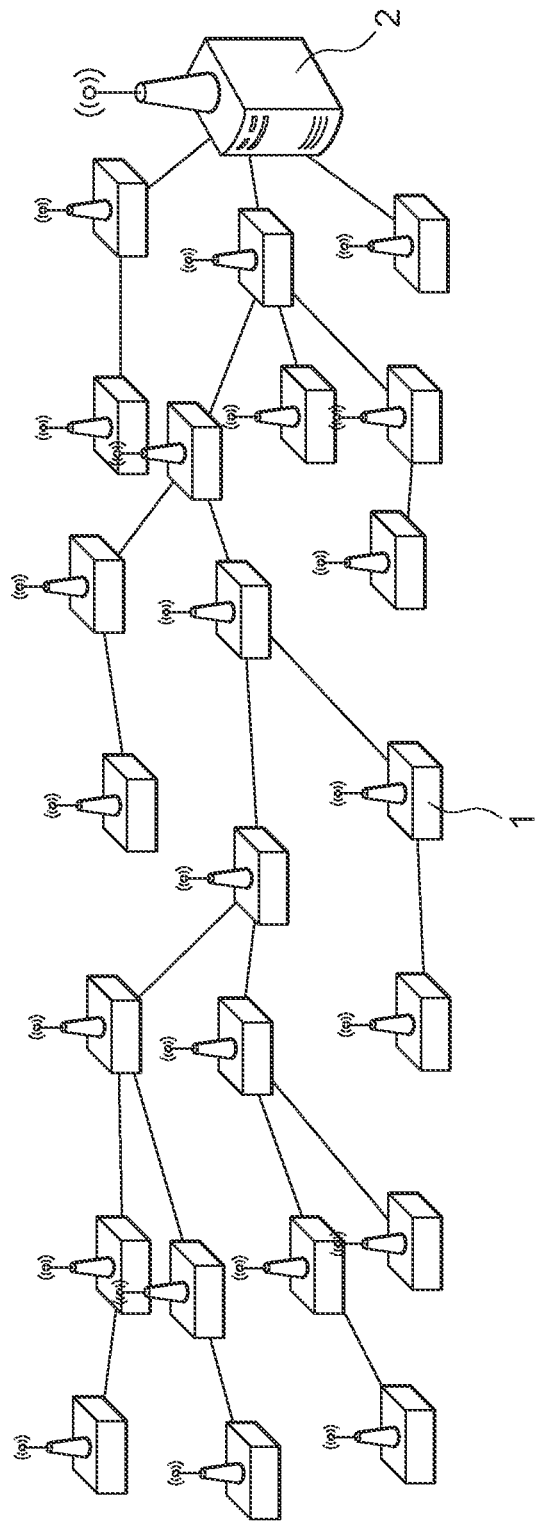
FIG. 1 is a diagram showing an example of a configuration of a wireless communication system according to a first embodiment.

First, a wireless communication system according to a first embodiment will be described with reference to FIGS. 1 to 21. FIG. 1 is a diagram showing an exemplary configuration of the wireless communication system according to the present embodiment. As shown in FIG. 1, this wireless communication system includes a plurality of wireless communication devices 1 and a concentrator 2. The wireless communication system includes a wireless mesh network, where the wireless communication device 1 is a wireless node and the concentrator 2 is a root node, and communicates according to a time division communication system.

In this wireless communication system, the wireless communication device 1 and the concentrator 2, arranged within a predetermined range of distance, can wirelessly communicate with each other. The wireless communication device 1 is mounted with a sensor such as a temperature sensor and an acceleration sensor and wirelessly transmits data measured by the sensor. The data transmitted by the respective wireless communication devices 1 is transmitted via another wireless communication device, or directly, to the concentrator 2. The concentrator 2 concentrates data transmitted by the respective wireless communication devices. The concentrator 2 is, for example, a server provided with a wireless communication function.

Figure 2:
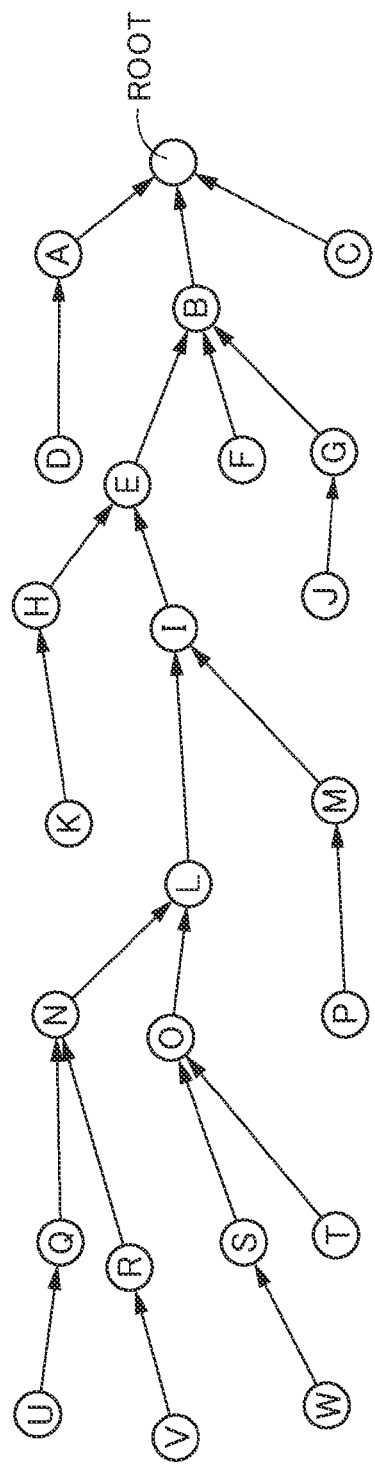
FIG. 2 is a diagram showing FIG. 1 in the form of a network topology.

FIG. 2 is a diagram schematically showing the wireless communication system in FIG. 1 in the form of a network topology. In FIG. 2, an alphabetical letter indicates the wireless node (wireless communication device 1) and "ROOT" indicates the root node (concentrator 2). In the following description, the wireless communication device and the concentrator 2 are referred to as a wireless node X and the root node, respectively. X corresponds to an alphabetical letter in the drawings.

When seen from a wireless node X, the direction toward the root node (where the number of hops to the root node is smaller) is referred to as upstream, and the direction away from the root node (where the number of hops to the root node is larger) is referred to as downstream. Furthermore, an upstream wireless node or the root node, transmitting or receiving data to or from the wireless node X, is referred to as a parent node and a downstream wireless node, transmitting or receiving data to or from the wireless node X, is referred to as a child node. An arrow in FIG. 2 shows a relationship between the wireless nodes. An arrow runs from a child node and points at a parent node. For example, in FIG. 2, a parent node of a wireless node B is the root node and child nodes of the wireless node B are wireless nodes E, F, and G.

Also, transmission, by the wireless node X, of data received from a child node (parent node) to a parent node (child node) is referred to as relay. Relay includes transmission of data received by the wireless node X while adding data of the wireless node X such as sensor data thereof. Furthermore, transmission of data from downstream to upstream (a first direction) is referred to as uplink transmission and transmission of data from upstream to downstream (a second direction) is referred to as downlink transmission.

Figure 3:
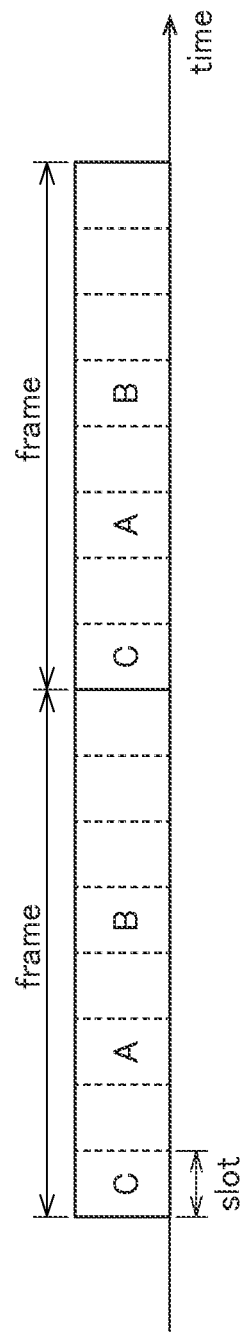
FIG. 3 is a diagram describing a time division communication system.

FIG. 3 is a diagram describing a time division communication system. In the time division communication system, an operation time per cycle in a wireless communication system is predetermined. This operation time is referred to as a frame. The wireless communication system operates by repeating this frame.

Each frame is time-divided into a plurality of slots. Each slot is allocated to one or more wireless nodes. The wireless node transmits data during a slot allocated thereto. For example, in FIG. 3, a first slot is allocated to a wireless node C, a third slot is allocated to a wireless node A, and a fifth slot is allocated to a wireless node B. In this case, the wireless node C transmits data during the first slots of the respective frames. Note that, the frame may include a slot not allocated to the wireless node.

Figure 4:
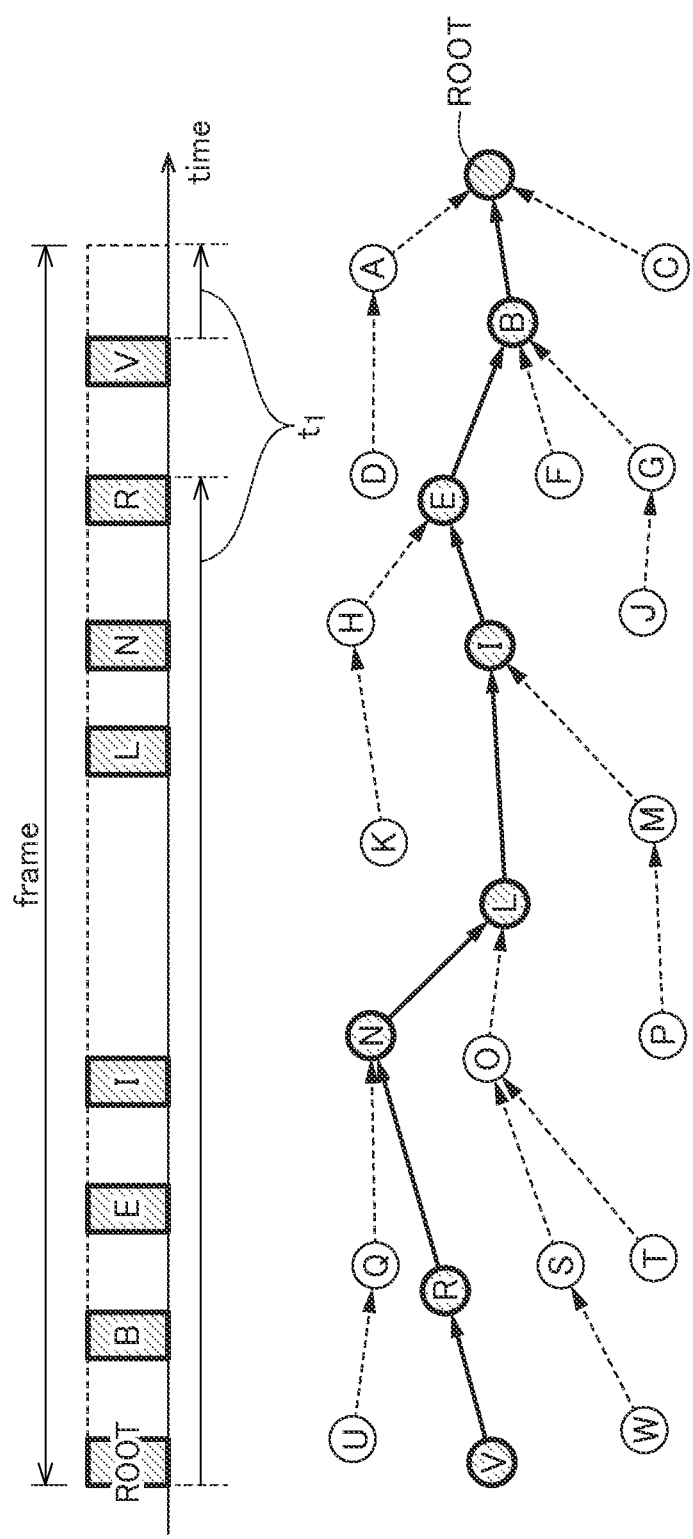
FIG. 4 is a diagram describing a slot allocation method according to the first embodiment.
Figure 5:
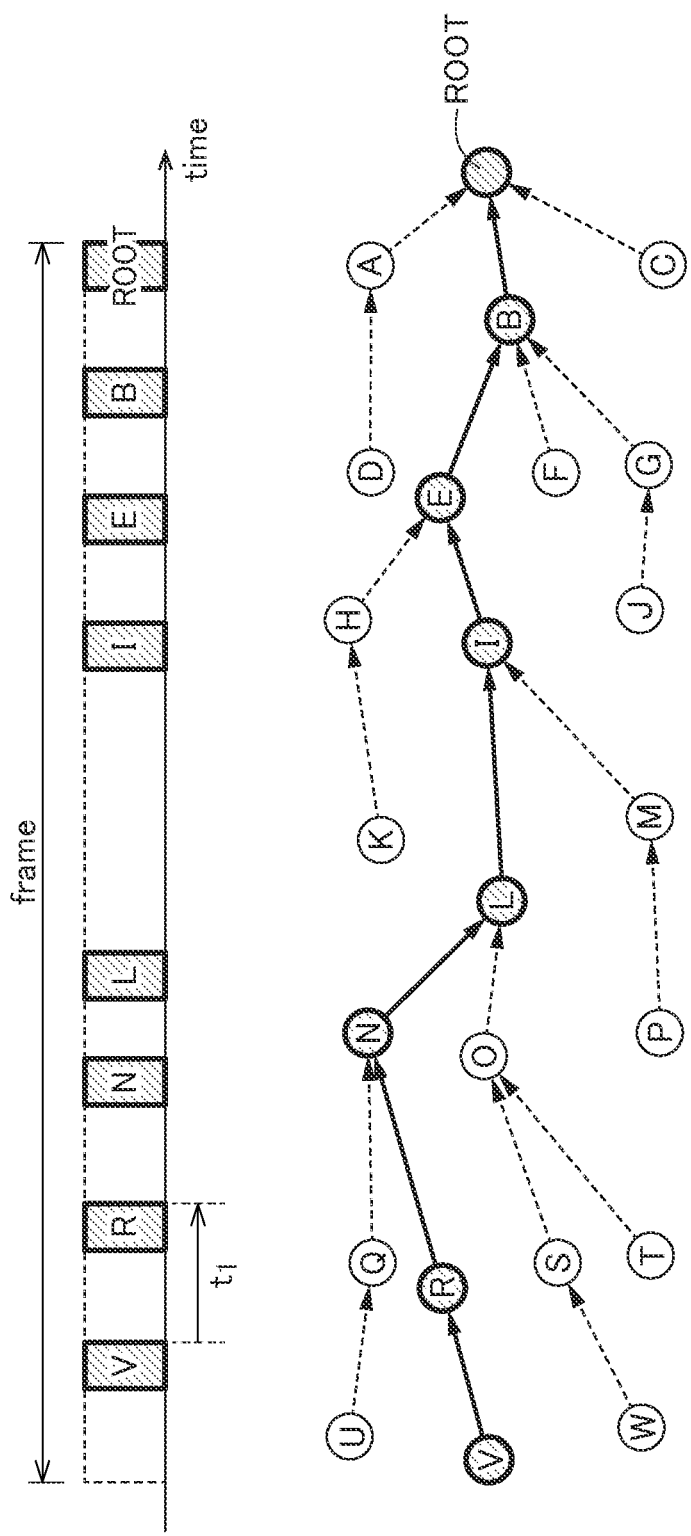
FIG. 5 is a diagram describing a slot allocation method according to the first embodiment.

Hereinafter, a slot allocation method in the wireless communication system according to the embodiment will be described with reference to FIGS. 4 to 10. FIGS. 4 and 5 are diagrams describing the slot allocation method according to the embodiment. In FIGS. 4 and 5, examples of wireless mesh networks and slots allocated to the respective wireless nodes for uplink transmission are shown.

In the wireless mesh network in FIG. 4, an earlier slot in a frame is allocated to a wireless node located later in a pathway of data communication. Specifically, when the pathway of data communication from a wireless node V includes wireless nodes V, R, N, L, I, E, B, and the root node, slots are allocated to the root node, the wireless nodes B, E, I, L, N, R, and V, in the order mentioned.

When the slots are allocated in this manner, a latency t1 where data transmitted by the wireless node V is relayed by the wireless node R is approximately one frame. Also in the subsequent respective wireless nodes, similar latencies occur. Therefore, in the wireless mesh network in FIG. 4, a data transfer time where the data transmitted by the wireless node V is transferred to the root node is a few frames.

On the other hand, in the wireless mesh network in FIG. 5, an earlier slot in a frame is allocated to a wireless node located earlier in a pathway of data communication. Specifically, when the pathway of data communication from a wireless node V includes wireless nodes V, R, N, L, I, E, B, and the root node, slots are allocated to the wireless nodes V, R, N, L, I, E, B, and the root node, in the order mentioned.

When the slots are allocated in this manner, a latency t1 where data transmitted by the wireless node V is relayed by the wireless node R is a few slots. Similarly, also in the subsequent respective wireless nodes, latencies are a few slots. As a result, in the wireless mesh network in FIG. 5, a data transfer time where the data transmitted by the wireless node V is transferred to the root node is within one frame.

In the wireless communication system according to the embodiment, slots are allocated to the respective wireless nodes in the manner as in the wireless mesh network in FIG. 5. That is, an earlier slot in a frame is allocated to a wireless node located earlier in a pathway of data communication. The wireless node located earlier in the pathway of data communication refers to a downstream wireless node in uplink or an upstream wireless node in downlink.

To achieve such allocation of slots, in this embodiment, a rank value R of a wireless node is set to a slot. The rank value R of a wireless node is the number of hops from the wireless node to the root node, namely, the number of data transmission.

Figure 6:
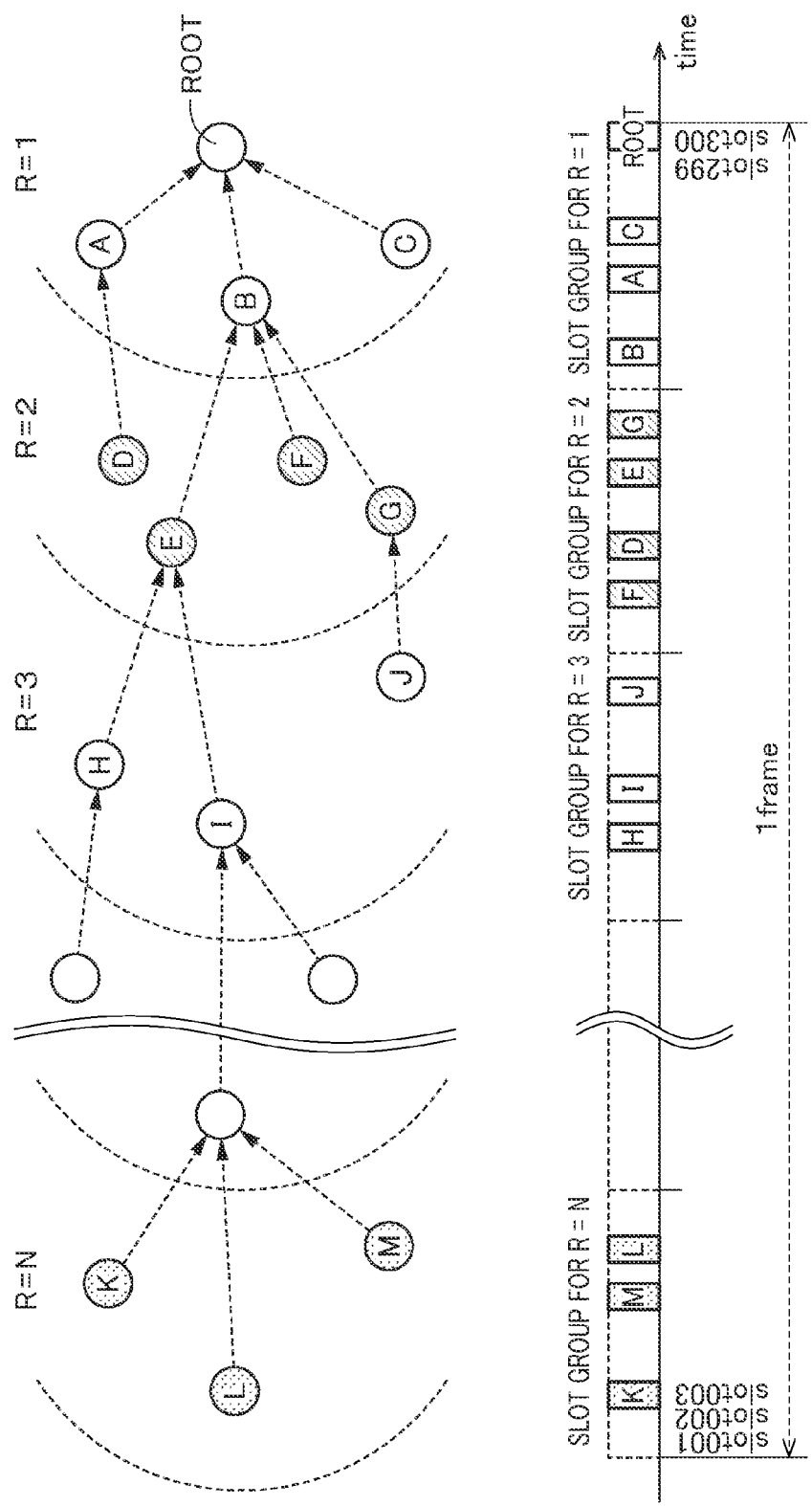
FIG. 6 is a diagram describing a slot allocation method in a simplex communication frame.

FIG. 6 is a diagram describing a slot allocation method according to the embodiment. For example, in FIG. 6, a wireless node A has one hop to a root node, and thus has a rank value of 1. A wireless node D has two hops to the root node, and thus has a rank value of 2. The largest number of hops in a wireless communication system in FIG. 6 is N, and thus, rank values of respective wireless nodes are one of the values from 1 to N.

In the embodiment, a plurality of slot groups is set in the frame, and a rank value R is set to the respective slot groups. The slot group is an interval including a plurality of consecutive slots. To prevent an overlap of the respective slot groups, N (where N is the largest number of hops) or more slot groups are set in the frame. For example, when the frame is time-divided into 300 slots with the largest number of hops N=10, ten slot groups, each including 30 consecutive slots, can be set. Note that the number of slots included in the respective slot groups may be the same or different.

The above-described rank value R is set to the respective slot groups. Methods of setting the rank value R are different between uplink and downlink. FIG. 6 is a diagram showing the method of setting the rank value R for uplink transmission.

As shown in FIG. 6, in uplink, the larger rank value R is set to an earlier slot group in a frame, and the smaller rank value R is set to a later slot group. For example, a rank value N is set to a first slot group in the frame shown in FIG. 6, and a rank value 1 is set to a last slot group.

On the other hand, the rank value R for downlink transmission is set to the respective slot groups in the reversed order of that for uplink. That is, in downlink, the smaller rank value R is set to an earlier slot group in the frame while the larger rank value R is set to a later slot group.

In this embodiment, each slot is allocated to a wireless node having the same rank value as the rank value R set to a slot group including the slot. For example, in uplink transmission, a slot included in the first slot group, to which the rank value N for uplink is set (slot group for R=N), is allocated to one of wireless nodes K, L, and M, each having the rank value N.

By allocating slots in this manner, an earlier slot in the frame can be allocated to a wireless node located in downstream in an uplink pathway of data communication. Similarly, an earlier slot in the frame can be allocated to a wireless node located in upstream in a downlink pathway of data communication.

That is, as in the wireless network in FIG. 5, an earlier slot in the frame can be allocated to a wireless node located earlier in the pathway of data communication. Therefore, with the wireless communication system according to the embodiment, in both uplink and downlink, data transfer time can be shortened to within one frame.

Hereinafter, a frame where only downlink or uplink transmission is performed is referred to as a simplex communication frame and a frame where both uplink and downlink transmission are performed is referred to as a duplex communication frame. The slot allocation method in the simplex communication frame is as described above. Here, slot allocation methods in the duplex communication frame will be further described with reference to FIGS. 7 to 10. FIGS. 7 to 10 are diagrams describing slot allocation methods in the duplex communication frame.

In this embodiment, in a duplex communication frame, when the rank value R is given, a rank value R+1 for uplink and a rank value R−1 for downlink are set to different slot groups. Similarly, when the rank value R is given, the rank value R−1 for uplink and the rank value R+1 for downlink are set to different slot groups.

Figure 7:
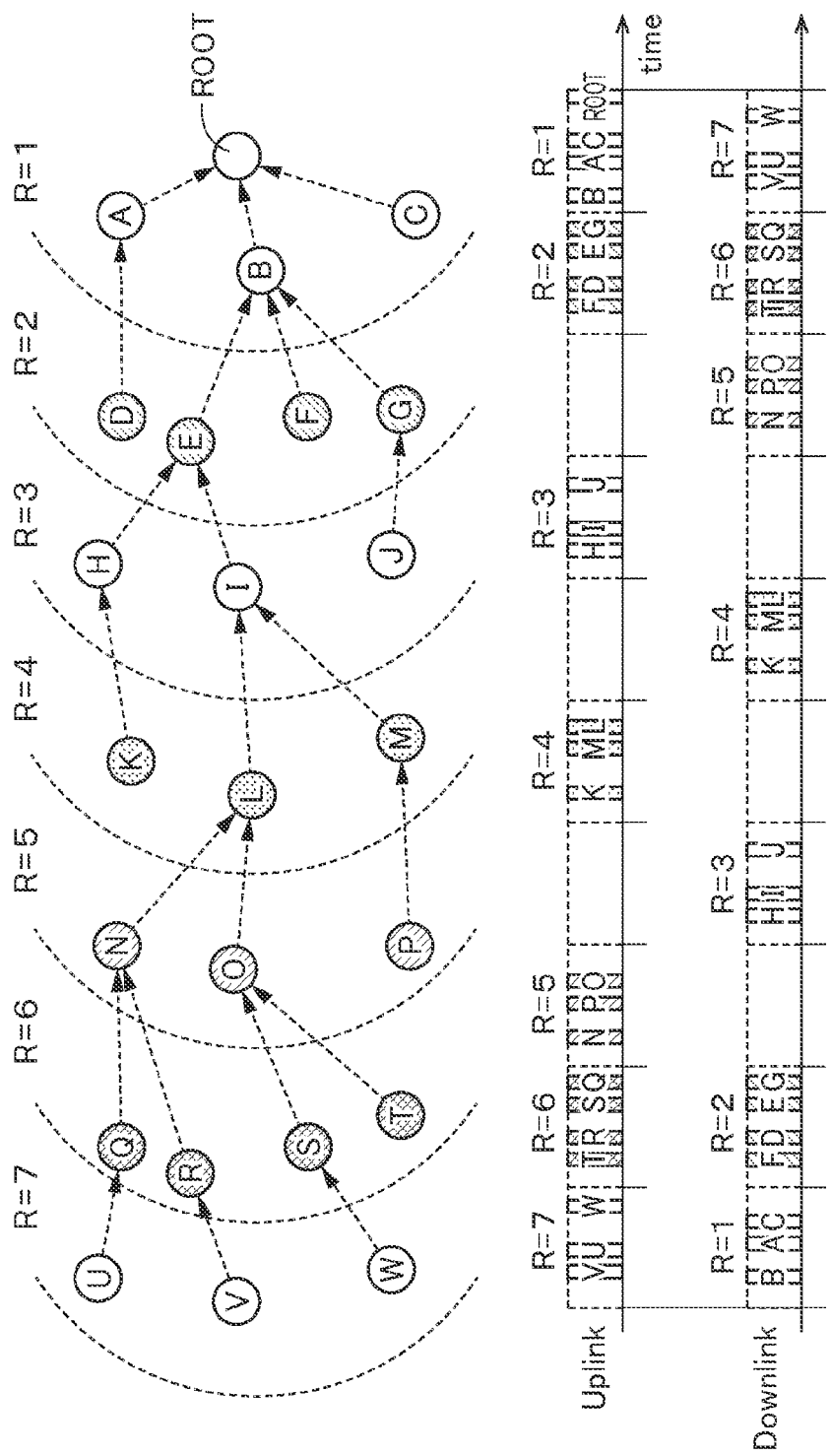
FIG. 7 is a diagram describing a slot allocation method in a duplex communication frame.

As a result, for example, only a rank value 5 for uplink is set to a third slot group in FIG. 7, and only a rank value 3 for downlink is set to a fourth slot group. Also, only a rank value 3 for uplink is set to a seventh slot group in FIG. 7, and only a rank value 5 for downlink is set to an eighth slot group. This is for preventing interference of wireless signals between wireless nodes apart by 2 in the rank value.

For example, in a first slot group in the frame, a wireless node with a rank value 7 and a wireless node with a rank value 1 simultaneously transmit wireless signals. However, since the wireless node with the rank value 7 and the wireless node with the rank value 1 are apart, their wireless signals do not interfere with each other.

On the other hand, when, in the third slot group in the frame, a wireless node with the rank value 5 and a wireless node with the rank value 3 simultaneously transmit wireless signals, since the wireless node with the rank value 5 and the wireless node with the rank value 3 are close, their wireless signals may interfere with each other.

However, as shown in FIG. 7, when the rank value 5 for uplink and the rank value 3 for downlink are set to different slot groups, the wireless node with the rank value 5 and the wireless node with the rank value 3 transmit wireless signals at different timings, thereby preventing interference of wireless signals. Therefore, degradation of communication quality caused by interference of wireless signals can be suppressed.

Figure 8:
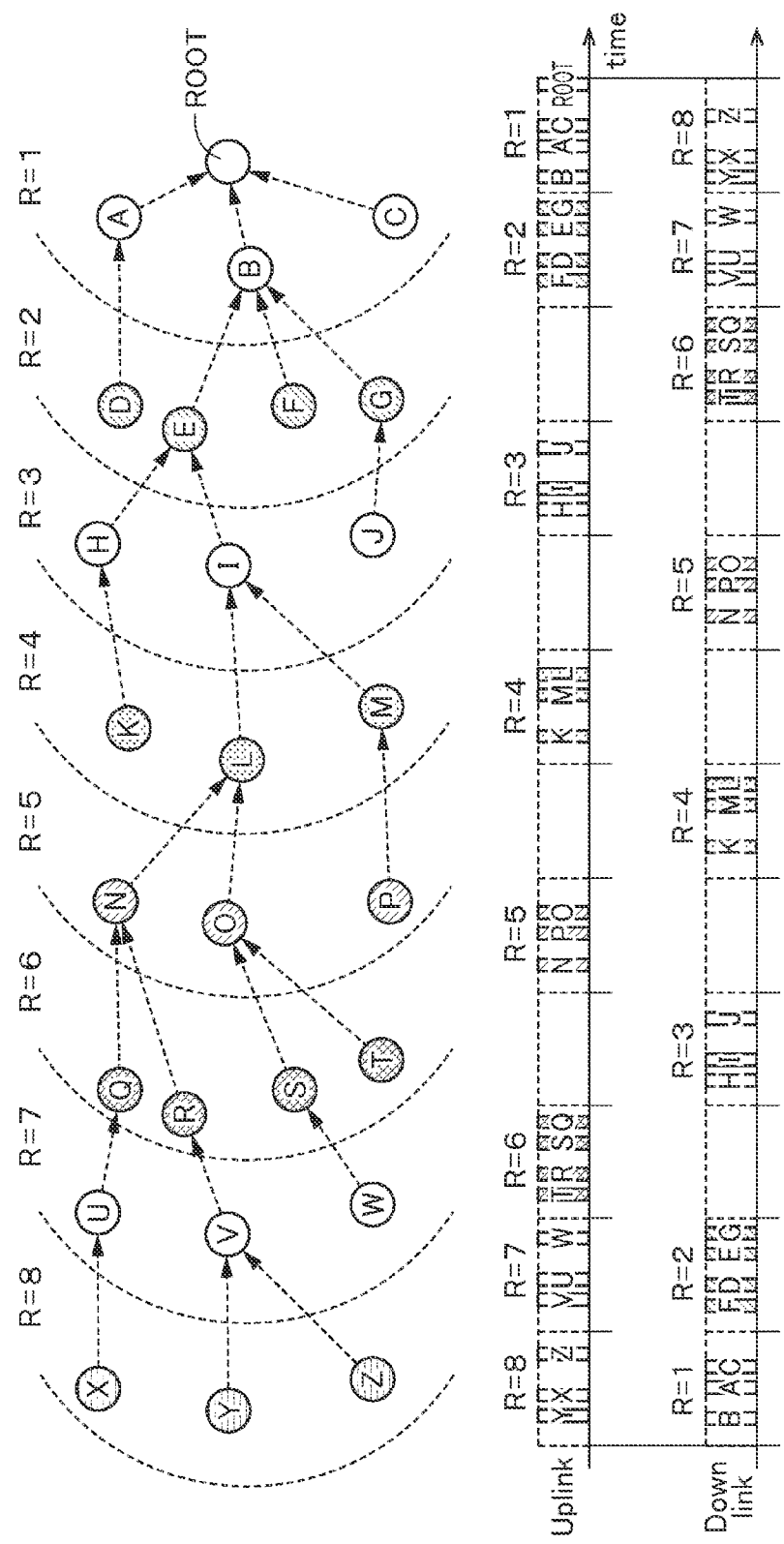
FIG. 8 is a diagram describing a slot allocation method in a duplex communication frame.

Such method of setting rank values can be performed not only when the largest number of hops N is an odd number as in FIG. 7 (N=7), but also when the largest number of hops N is an even number as in FIG. 8 (N=8).

Moreover, when there is a possibility of interference of wireless signals even when the rank values are apart by 3, with the given rank value R, it is only necessary that the rank value R for uplink and rank values R+3 and R−3 for downlink be set to different slot groups. This allows for preventing interference of wireless signals between wireless nodes apart by 3 in the rank value.

Figure 9:
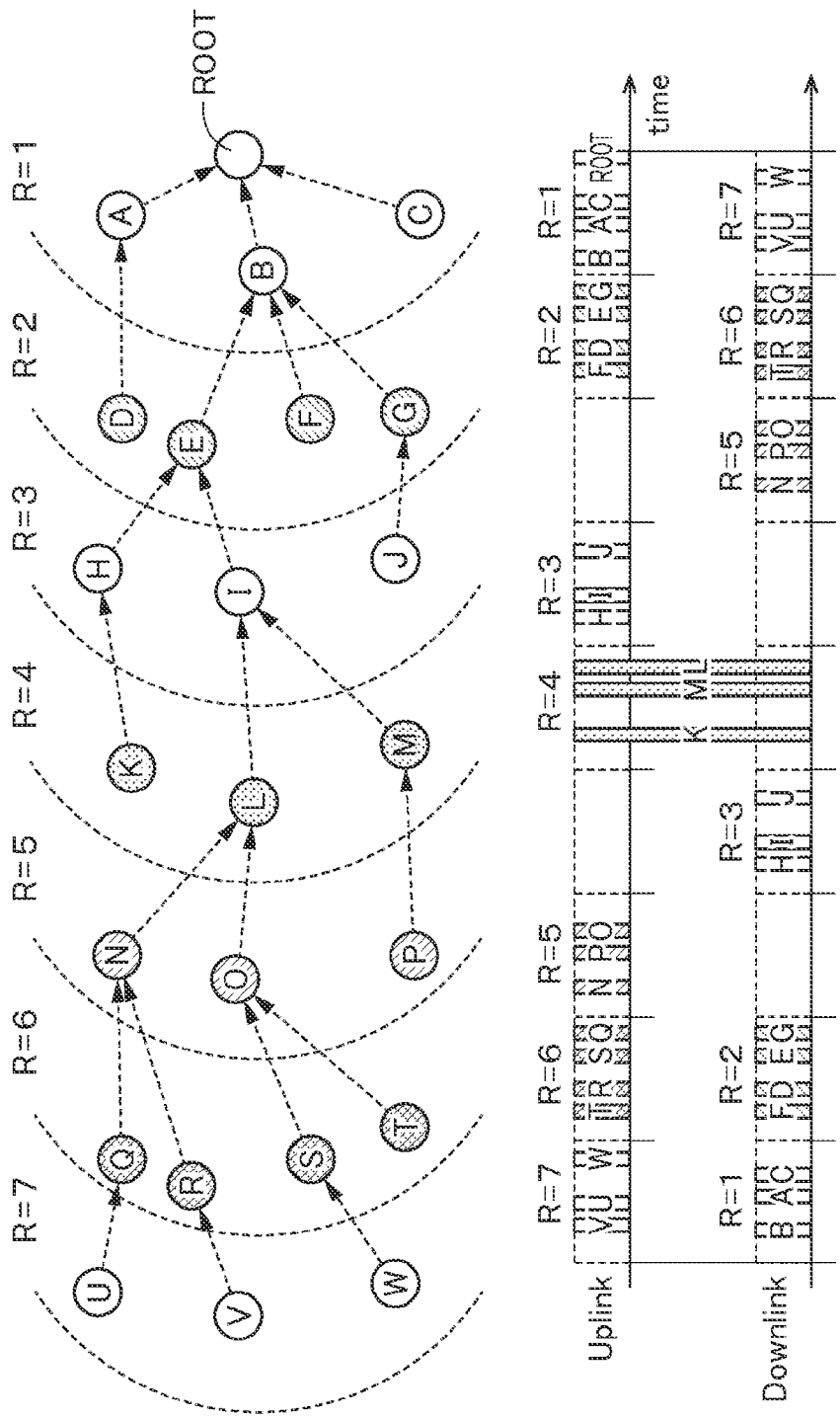
FIG. 9 is a diagram describing a slot allocation method in a duplex communication frame.
Figure 10:
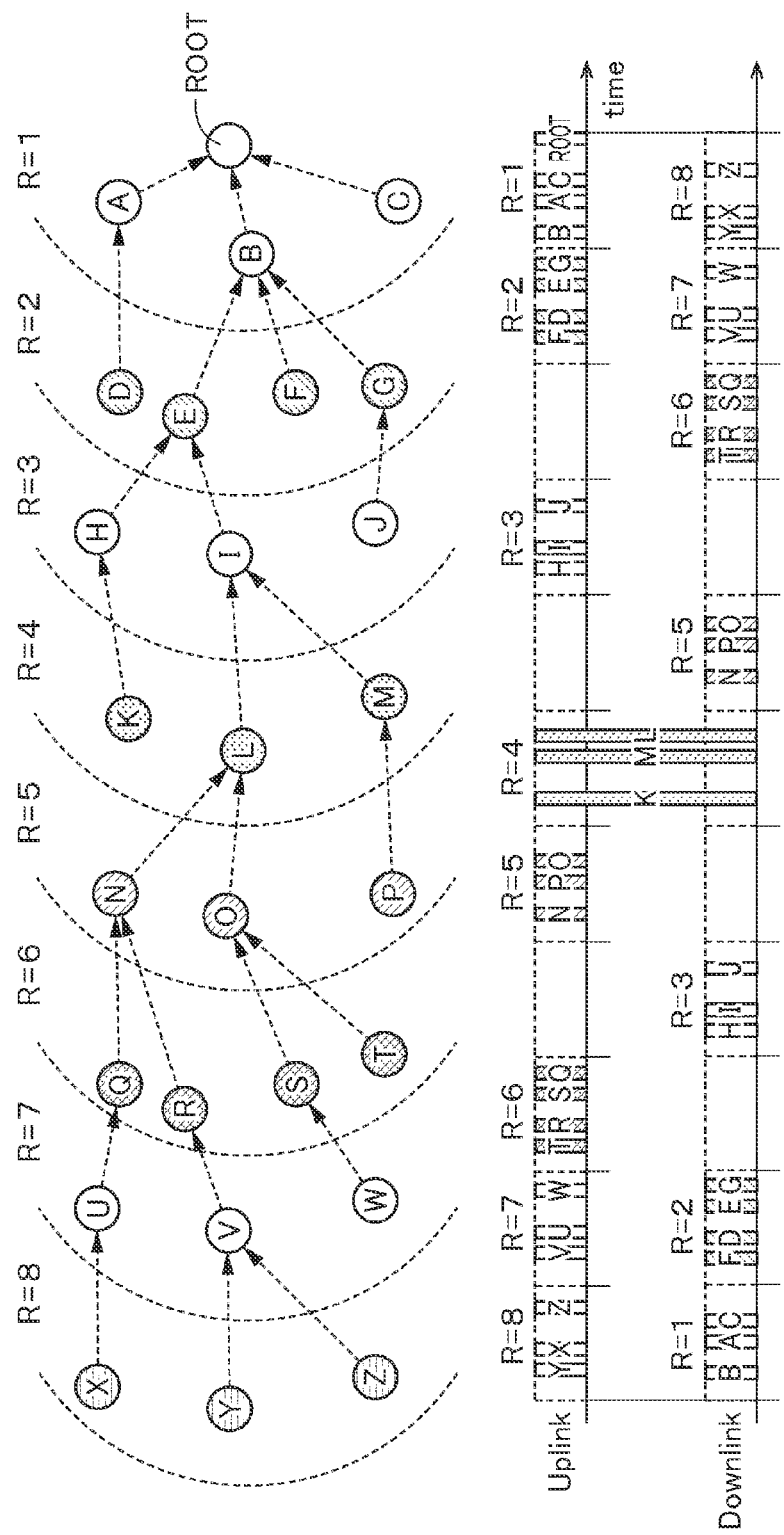
FIG. 10 is a diagram describing a slot allocation method in a duplex communication frame.

Moreover, although the rank value R for uplink and the rank value R for downlink are set to different slot groups in FIGS. 7 and 8, the rank value R may be set to the same slot group as shown in FIGS. 9 and 10.

In this case, in a slot group to which the rank value R for uplink and the rank value R for downlink are set, a wireless node having the rank value R performs uplink and downlink transmission simultaneously. For example, in the case of FIG. 9, a wireless node L having a rank value 4 performs uplink transmission to a wireless node I and downlink transmission to wireless nodes N and O simultaneously in a slot allocated to the wireless node L. Allocating the rank value R for uplink and the rank value R for downlink to the same slot group allows for reducing the number of slot groups, thereby shortening a frame.

Figure 11:
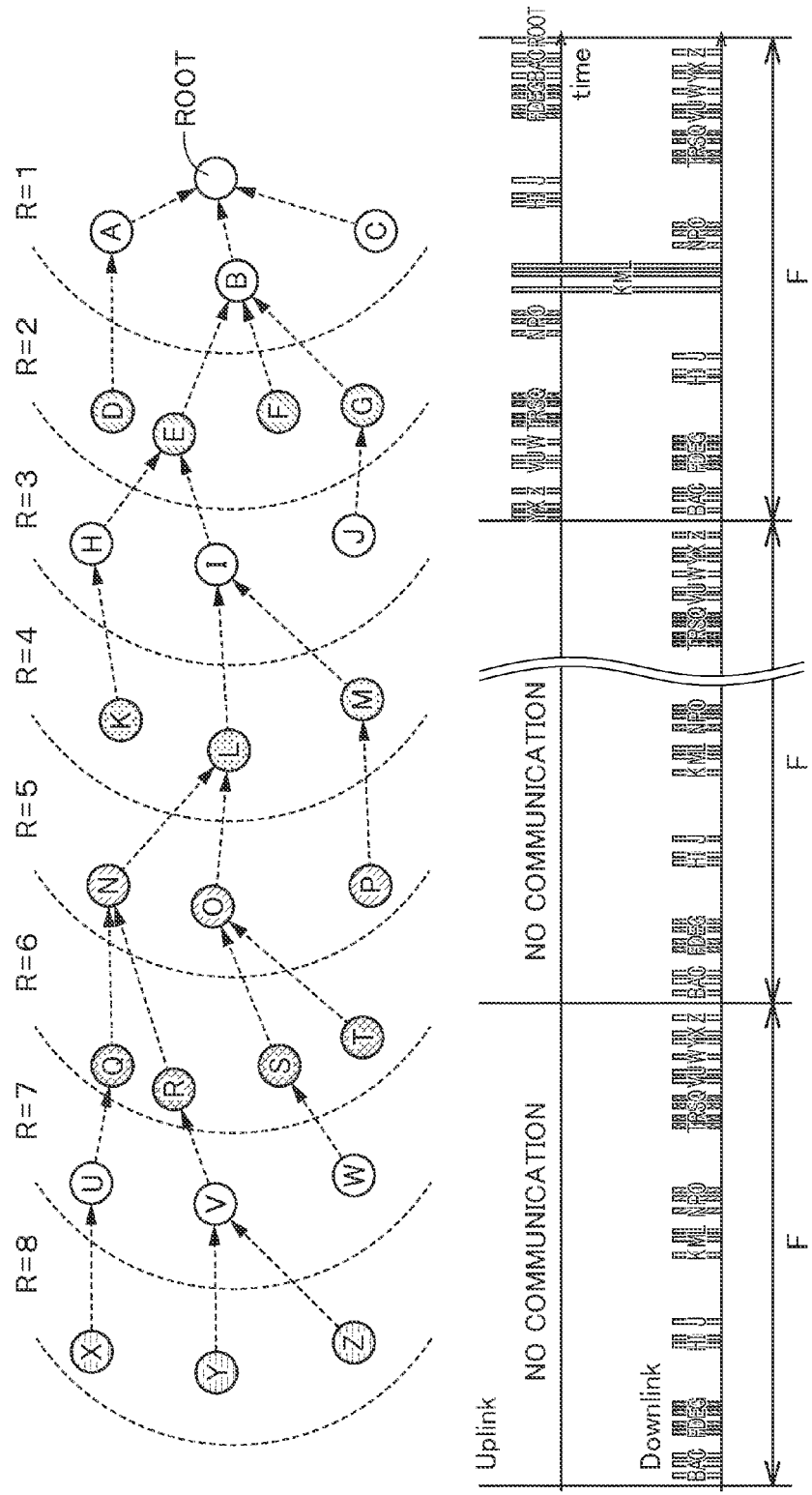
FIG. 11 is a diagram describing a method of setting transmission intervals.

Next, a method of setting a transmission interval in the wireless communication system according to the embodiment will be described with reference to FIG. 11. In this embodiment, as shown in FIG. 11, downlink transmission is performed for every frame and uplink transmission is performed for every M frames. M is any integer of 2 or more. That is, a cycle of M frames, including one duplex communication frame and (M−1) simplex communication frames, is repeated.

In this wireless communication system, when time per frame is defined as F, the respective wireless nodes X perform downlink transmission with an interval F and uplink transmission with an interval F×M. That is, the uplink transmission interval is set to be longer than the downlink transmission interval. This is because it is assumed that sensor data is transmitted in uplink while control data of the wireless communication system is transmitted in downlink.

Generally, sensor data is, as compared to control data, greater in volume but less in transmission frequency required. Therefore, performing uplink and downlink transmission for every frame may cause issues such as: a transmission frequency of control data falls short; or sensor data is transmitted at a greater transmission frequency than required, thereby increasing power consumption of the wireless communication system.

Therefore, in this embodiment, the time F per frame is set such that control data can be transmitted at a required transmission frequency. For example, when it is required to transmit control data every 5 minutes, the time F per frame is set to be 5 minutes or less.

Also, the uplink transmission interval is set to be longer as data volume for uplink transmission is larger. That is, when the data volume for uplink transmission is defined as v1, and data volume for downlink transmission is defined as v2 (<v1), the larger the value of v1/v2 is, the larger M is set.

Setting uplink and downlink transmission intervals in this manner allows for meeting the required transmission frequency of the control data while reducing uplink transmission having large data volume, thereby reducing power consumption of the wireless communication device and system.

Note that, when the data volume for uplink transmission is smaller than the data volume for downlink transmission, uplink transmission can be performed for every frame, and, downlink transmission can be performed for every M frames. Moreover, when a transmission frequency required for uplink is greater than a transmission frequency required for downlink, the time F per frame can be set according to the transmission frequency required for uplink.

Figure 12:
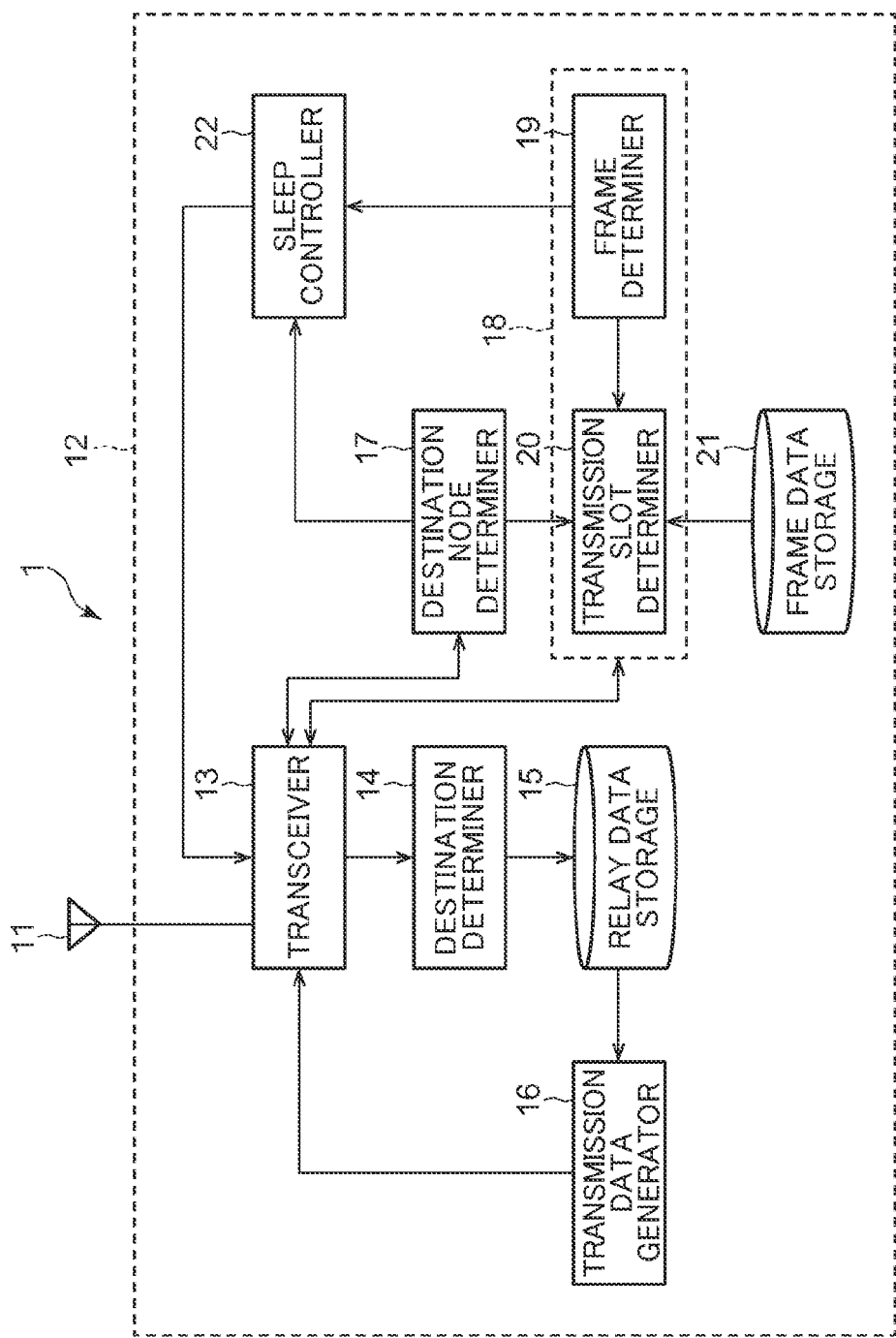
FIG. 12 is a diagram showing a functional configuration of a wireless communication device according to the first embodiment.

Next, a configuration of the wireless communication device 1 included in the wireless communication system according to the embodiment will be described with reference to FIGS. 12 and 13. The wireless communication device 1 according to the embodiment automatically achieves the slot allocation as described above. FIG. 12 is a diagram showing a functional configuration of the wireless communication device 1. As shown in FIG. 12, the wireless communication device 1 includes a transmission and reception antenna 11 and a wireless communication unit 12.

Hereinafter, the wireless communication device 1 is referred to as the present node. A wireless node that transmits data to the present node is referred to as a source node. A wireless node to which the present node transmits data is referred to as a destination node. Also, a slot group to which the rank value R is set is referred to as a slot group R.

The transmission and reception antenna 11 transmits or receives wireless signals. The transmission and reception antenna 11 converts the received wireless signals into electrical signals, and inputs the electrical signals to the wireless communication unit 12. The transmission and reception antenna 11 converts electrical signals, output from the wireless communication unit 12, into wireless signals and transmits the wireless signals.

The wireless communication unit 12 includes a transceiver 13, a destination determiner 14, a relay data storage 15, a transmission data generator 16, a destination node determiner 17, a timer 18, a frame data storage 21, and a sleep controller 22.

The transceiver 13 receives data from the source node. That is, the transceiver 13 performs predetermined signal processing to the electrical signals input from the transmission and reception antenna 11 and obtains data. The signal processing includes analog-to-digital conversion and decoding in accordance with a predetermined communication protocol. The data received by the transceiver 13 includes the rank value, a node ID, and relay data of the source node and a node ID of the destination node.

A node ID is an identifier of each wireless communication device included in the wireless communication system. The relay data is data relayed by the source node after being received from another wireless node. In uplink, the relay data includes sensor data. In downlink, the relay data includes control data. The destination node is a wireless node which is a destination of data transmitted by the source node.

Figure 13:
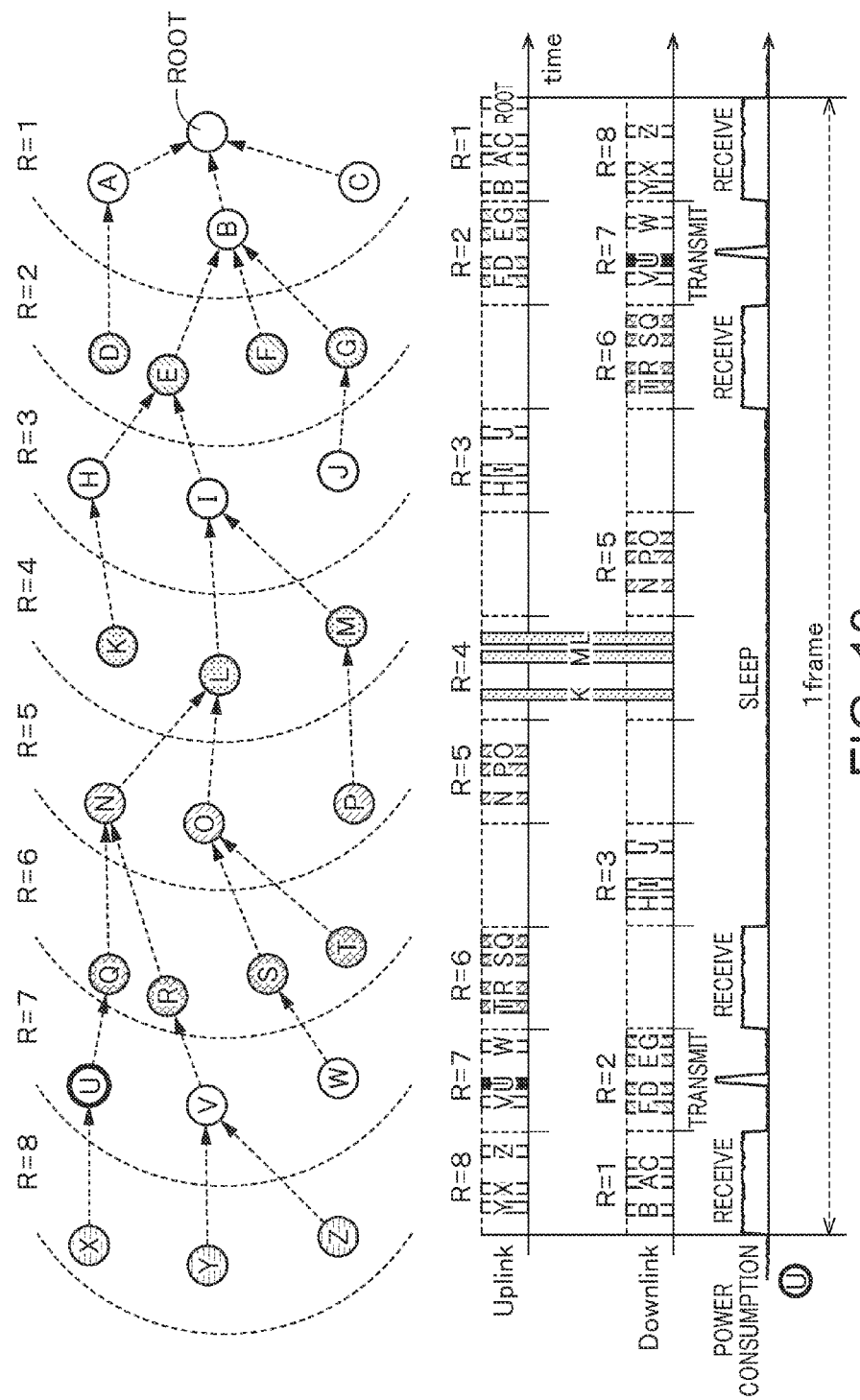
FIG. 13 is a diagram describing operation timings of a transceiver.

FIG. 13 is a diagram describing operation timings of the transceiver 13. In FIG. 13, operation timings of a wireless node U having a rank value 7 is shown.

In uplink, the transceiver 13 performs a reception operation during a slot group R+1 to which a rank value R+1 larger by 1 than the rank value R of the present node is set. For example, the transceiver 13 of the wireless node U performs a reception operation during a first slot group to which a rank value 8 for uplink is set. This allows the transceiver 13 to receive data from a downstream wireless node including the child node. Based on the data received from the child node, the transmission data generator 16 generates uplink transmission data.

Furthermore, in uplink, the transceiver 13 performs a reception operation during a slot group R−1 to which a rank value R−1 smaller by 1 than the rank value R of the present node is set. For example, the transceiver 13 of the wireless node U performs a reception operation during a third slot group a rank value 6 for uplink is set. This allows the transceiver 13 to receive data from an upstream wireless node including the parent node. Based on the data received from the upstream wireless node, the destination node determiner 17 updates the parent node.

On the other hand, in downlink, the transceiver 13 performs a reception operation during a slot group R−1 to which the rank value R−1 smaller by 1 than the rank value R of the present node is set. For example, the transceiver 13 of the wireless node U performs a reception operation during a ninth slot group to which a rank value 6 for downlink is set. This allows the transceiver 13 to receive data from an upstream wireless node including the parent node. Based on the data received from the parent node, the transmission data generator 16 generates downlink transmission data.

In downlink, the transceiver 13 also performs a reception operation during a slot group R+1 to which the rank value R+1 larger by 1 than the rank value R of the present node is set. For example, the transceiver 13 of the wireless node U performs a reception operation during an eleventh slot group to which the rank value 8 for downlink is set. This allows the transceiver 13 to receive data from a downstream wireless node including the child node. Based on the data received from the downstream wireless node, the destination node determiner 17 updates the child node.

Furthermore, the transceiver 13 transmits the transmission data to the destination node. That is, the transceiver 13 performs predetermined signal processing to the transmission data generated by the transmission data generator 16, converts the transmission data into electrical signals, and inputs the electrical signals to the transmission and reception antenna 11. The signal processing includes digital-to-analog conversion and encoding in accordance with a predetermined communication protocol. The transmission data includes the rank value, the node ID, and the relay data of the present node and the node ID of the destination node.

In uplink, the transceiver 13 performs a transmission operation during a transmission slot included in a slot group R to which the same rank value R for uplink as the rank value R of the present node is set. For example, the transceiver 13 of the wireless node U performs a transmission operation during a transmission slot included in a second slot group to which the rank value 7 for uplink is set. This allows the transceiver 13 to relay, to the parent node, the data received from the child node.

Also, in downlink, the transceiver 13 performs a transmission operation during a transmission slot included in a slot group R to which the same rank value R for downlink as the rank value R of the present node is set. For example, the transceiver 13 of the wireless node U performs a transmission operation during a transmission slot included in a tenth slot group to which the rank value 7 for downlink is set. This allows the transceiver 13 to relay, to the child node, the data received from the parent node.

Note that, the transmission slot where the transceiver 13 performs the transmission operation is determined from among a plurality of slots included in the slot group R by a transmission slot determiner 20, which will be described later.

The destination determiner 14 obtains the data received by the transceiver 13 and determines whether a destination of the received data is the present node. When the node ID of the destination node included in the received data is the node ID of the present node, the destination determiner 14 determines that the destination of the received data is the present node.

The relay data storage 15 temporarily stores, as relay data, the received data, the destination of which has been determined as the present node by the destination determiner 14.

The transmission data generator 16 generates transmission data based on the relay data stored in the relay data storage 15. The transmission data is generated by adding, to the relay data, data such as the rank value and the node ID of the present node. In uplink, sensor data of the present node, for example, is further added to the relay data. The transmission data generated by the transmission data generator 16 is transmitted by the transceiver 13 as described above.

The destination node determiner 17 determines the destination node of the transmission data based on the data received by the transceiver 13. In uplink, the destination node is the parent node and, in downlink, the destination node is the child node. A node ID of the destination node determined by the destination node determiner 17 is added to the transmission data.

The destination node determiner 17, for example, refers to the rank value of the source node included in the data received by the transceiver 13 and determines, as the parent node, a wireless node having the highest wireless signal intensity among wireless nodes having the rank value smaller by 1 than the rank value of the present node.

The destination node determiner 17, for example, refers to the rank value of the source node included in the data received by the transceiver 13 and determines, as the child node, a wireless node having the highest wireless signal intensity among wireless nodes having the rank value larger by 1 than the rank value of the present node.

Alternatively, the destination node determiner 17, for example, may refer to the node ID of the destination node included in the data received by the transceiver 13 and determine, as the child node, a wireless node, the destination of which is the present node.

The timer 18 determines a timing for the transceiver 13 to transmit the transmission data, namely, the transmission slot, such that an uplink transmission interval is longer than a downlink transmission interval. As shown in FIG. 12, the timer 18 includes a frame determiner 19 and a transmission slot determiner 20.

The frame determiner 19 determines a type of the current frame (duplex communication frame or simplex communication frame). The frame determiner 19, for example, can determine whether the current frame is the duplex communication frame by comparing a start time and a finish time of the duplex communication frame with the current time. The start time or the finish time of the duplex communication frame may be preset or be included in control data received in downlink.

The transmission slot determiner 20 determines the transmission slot based on the frame type determined by the frame determiner 19 and frame data. The frame data is setting data of the frames, the slots, the slot groups, etc. in the wireless communication system as described above. The frame data may be preregistered in the wireless communication device 1 or registered and updated by means of wireless communication. The frame data is stored in the frame data storage 21.

The transmission slot determiner 20 first obtains the determination result from the frame determiner 19. When the current frame is the simplex communication frame, the transmission slot determiner 20 selects the slot group R for downlink based on the rank value R of the present node and the frame data. Next, the transmission slot determiner 20 determines the transmission slot from among slots included in the slot group R.

When the current frame is the duplex communication frame, the transmission slot determiner 20 selects the slot group R for downlink and the slot group R for uplink based on the rank value R of the present node and the frame data. Next, the transmission slot determiner 20 determines the transmission slot for uplink and the transmission slot for downlink from among the slots included in the slot group R for uplink and the slot group R for downlink, respectively.

The transmission slot determiner 20, for example, may determine the transmission slots from the slot groups R by using the node ID of the present node. Specifically, node IDs of respective wireless nodes included in the wireless communication system may be pre-allocated to the slots in the respective slot groups, and the node IDs may be stored as the frame data in the frame data storage 21. For example, when the wireless communication system includes twenty wireless nodes having node IDs of 1 to 20, each slot group may be preset to include twenty slots to which the node IDs of 1 to 20 are allocated. Then, the transmission slot determiner 20 is only required to determine, as the transmission slots, slots to which the node ID of the present node is allocated from slot groups R. Note that a method to determine the transmission slot from the slot group R is not limited to the above.

Determination of the transmission slot by the timer 18 in such a manner allows for allocating, to the wireless communication device 1, the transmission slot corresponding to the rank value of the present node. As a result, the above-described slot allocation can be automatically achieved.

Note that the timer 18 may perform synchronization processing before determining the transmission slot. The synchronization processing is to synchronize a time counted in the present node with another wireless node.

The timer 18, for example, obtains a transmission time (transmission slot) from the source node based on the rank value and the node ID of the source node included in the data received by the transceiver 13 and the frame data. The timer 18 can perform the synchronization processing by comparing the sum of the transmission time and a signal processing time at the transceiver 13 of the present node with the time counted in the present node. Here, the synchronization processing may be performed by further adding time required for wireless signal propagation from the source node.

The sleep controller 22 functions while power is supplied thereto, regardless of an operation state of the wireless communication unit 12. The sleep controller 22 counts time and controls an operation state of the transceiver 13 between a sleep state and an awake state based on the counted time, the rank value of the present node, the frame data, and the transmission slot determined by the transmission slot determiner 20.

The sleep state is a state where transmission or reception of data by the transceiver 13 is halted. In the sleep state, since no transmission or reception of data is performed, power consumption of the wireless communication device 1 is reduced. The awake state is a state where the transceiver 13 may transmit or receive data. Hereinafter, transition of the transceiver 13 from the awake state to the sleep state is referred to as "going to sleep" and transition from the sleep state to the awake state is referred to as "waking up."

The sleep controller 22 retains the transceiver 13 in the sleep state while the transceiver 13 does not transmit or receive data and retains the transceiver 13 in the awake state while the transceiver 13 transmits or receives data. Specifically, the sleep controller 22 retains the transceiver 13 in the awake state during the transmission slot determined by the transmission slot determiner 20. The sleep controller 22 determines an interval where the transceiver 13 receives data based on the counted time, the rank value of the present node, the frame data, and the transmission slot determined by the transmission slot determiner 20 and retains the transceiver 13 in the awake state during reception thereby. The sleep controller 22 retains the transceiver 13 in the sleep state for other intervals.

Figure 14:
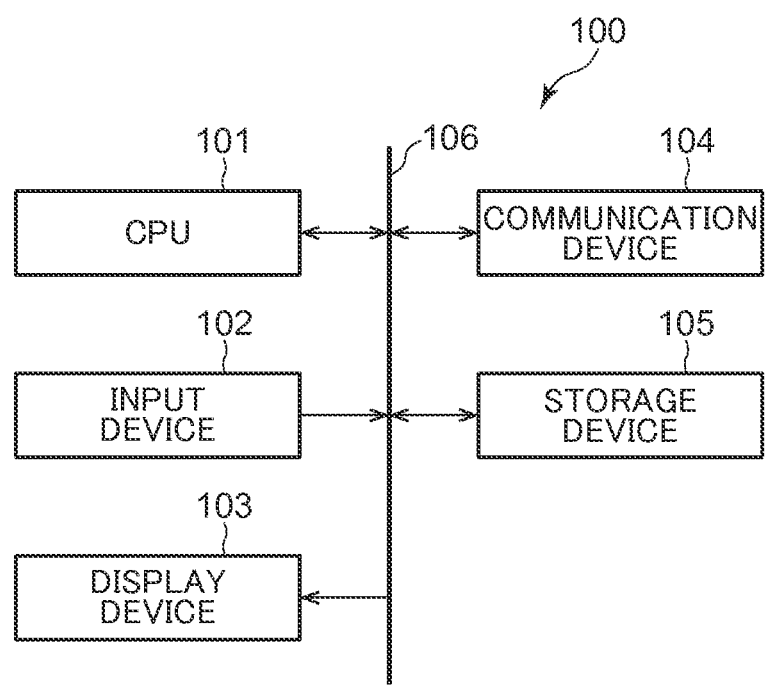
FIG. 14 is a block diagram showing a hardware configuration of a wireless communication device.

Next, a hardware configuration of the wireless communication device 1 will be described with reference to FIG. 14. As shown in FIG. 14, the wireless communication device 1 includes a computer 100. The computer 100 includes a central processing unit (CPU) 101, an input device 102, a display device 103, a communication device 104, and a storage device 105, which are connected to each other by a bus 106.

The CPU 101 is a control device and an arithmetic device of the computer 100. The CPU 101 performs arithmetic processing based on data or a program input from the respective devices (e.g. the input device 102, the communication device 104, and the storage device 105) connected thereto via the bus 106 and outputs the arithmetic result or control signals to the respective devices (e.g. the display device 103, the communication device 104, and the storage device 105) connected thereto via the bus 106.

Specifically, the CPU 101 executes an operating system (OS) of the computer 100 or a wireless communication program and controls the respective devices included in the computer 100. The wireless communication program allows the computer 100 to implement the above-described functional configurations of the wireless communication unit 12. Execution of the wireless communication program by the CPU 101 allows the computer 100 to function as the wireless communication device 1.

The input device 102 inputs data to the computer 100. The input device 102 may be, for example, a keyboard, a mouse, or a touch screen, but is not limited thereto. Note that the wireless communication device 1 may be configured without the input device 102.

The display device 103 displays an image or a projected image. The display device 103 may be, for example, a liquid crystal display (LCD), a cathode-ray tube (CRT), or a plasma display panel (PDP), but is not limited thereto. The received data or the transmission data may be displayed on the display device 103. Note that the wireless communication device 1 may be configured without the display device 103.

The communication device 104 allows the computer 100 to communicate with an external device (e.g. another wireless node) in a wireless or wired manner. The communication device 104 may be, for example, a modem, a hub, or a router, but is not limited thereto. Data such as the received data, the transmission data, and the frame data may be input from an external device via the communication device 104. The transceiver 13 may be configured by using the communication device 104. Also, the transmission and reception antenna 11 may be included in the communication device 104.

The storage device 105 stores the OS of the computer 100, the wireless communication program, data required for execution of the wireless communication program, data generated upon execution of the wireless communication program, etc. The storage device 105 includes a main memory and an external storage device. The main memory may be, for example, a RAM, a DRAM, or an SRAM, but is not limited thereto. The external storage device may be a hard disk, an optical disk, a flash memory, or a magnetic tape, but is not limited thereto. The relay data storage 15 or the frame data storage 21 may be configured by using the storage device 105.

Note that the computer 100 may include one or more CPUs 101, input devices 102, display devices 103, communication devices 104, and storage devices 105 or be connected to a peripheral device such as a printer or a scanner.

Furthermore, the wireless communication unit 12 may be configured by the single computer 100 or a system including the plurality of computers 100 connected to each other.

Moreover, the wireless communication program may be prestored in the storage device 105 of the computer 100, stored in a storage medium such as a CD-ROM, or uploaded on the Internet. In any of these cases, by installing and executing the wireless communication program on the computer 100, the wireless communication device 1 can be configured.

Furthermore, a sensor such as a temperature sensor and an acceleration sensor may be connected to the computer 100 directly or via the communication device 104 in a wireless or wired manner.

Next, operations of the wireless communication device 1 according to the embodiment in the respective frames will be described with reference to FIGS. 15 to 21. Hereinafter, it is assumed that, at a starting point of the frame, the transceiver 13 is in the sleep state with the parent node and the child node having been determined. When a new frame starts, the frame determiner 19 first determines a type of the current frame. The determination method is as described above.

Figure 15:
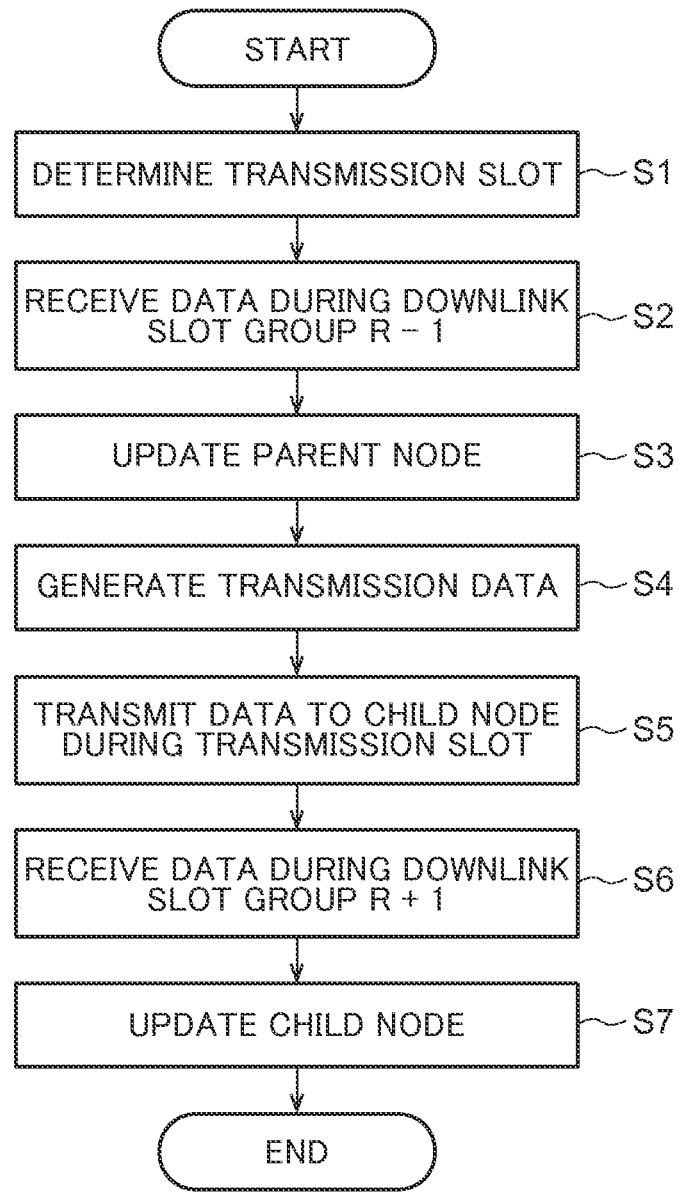
FIG. 15 is a flowchart showing operations of the wireless communication device in a simplex communication frame.
Figure 16:
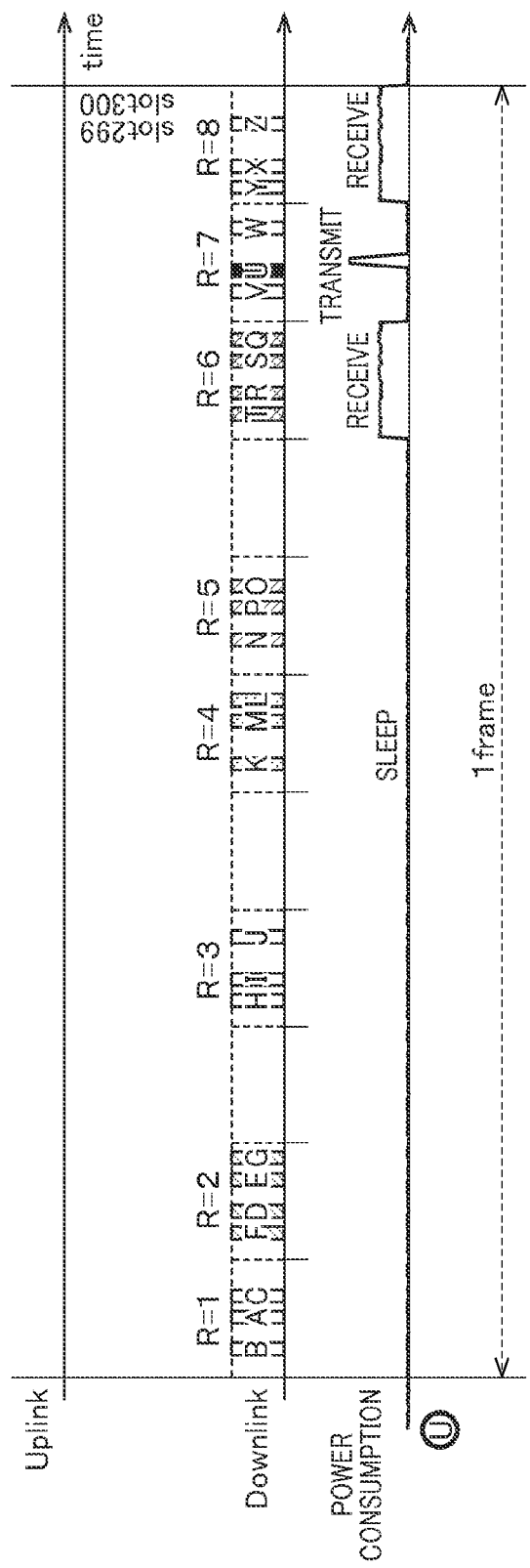
FIG. 16 is a diagram showing an example of operations of the wireless communication device in a simplex communication frame.

First, operations of the wireless communication device 1 in the simplex communication frame will be specifically described with reference to FIGS. 15 and 16. FIG. 15 is a flowchart showing operations in a simplex communication frame. Hereinafter, it is assumed that the wireless communication device 1 is a wireless node U having a rank value 7.

In step S1, the transmission slot determiner 20 determines a downlink transmission slot from a slot group 7 for downlink, to which the rank value 7 of the present node is set. Thereafter, the wireless communication device 1 stands by until a slot group 6 for downlink starts.

In step S2, the transceiver 13 receives data during the slot group 6 for downlink. Specifically, when the slot group 6 for downlink starts, the sleep controller 22 wakes up the transceiver 13, and then, the transceiver 13 initiates data reception. This allows the transceiver 13 to receive data from an upstream wireless node having a rank value 6. With the data received by the transceiver 13, a destination node thereof is determined by the destination determiner 14, and the data transmitted from the parent node to the present node is stored in the relay data storage 15. When the slot group 6 for downlink finishes, the transceiver 13 terminates data reception, and the sleep controller 22 retains the transceiver 13 in the sleep state.

In step S3, the destination node determiner 17 determines a new parent node based on the data received by the transceiver 13 in step S2. The method of determining the parent node is as described above. As a result, the parent node can be updated according to the latest communication state.

In step S4, the transmission data generator 16 generates the transmission data based on the relay data stored in the relay data storage 15. The method of generating the transmission data is as described above. Then, the wireless communication device 1 stands by until the transmission slot determined in step S1 starts.

In step S5, the transceiver 13 transmits the transmission data to the child node. Specifically, when the transmission slot for downlink starts, the sleep controller 22 wakes up the transceiver 13, and then, the transceiver 13 initiates transmission of the transmission data. This allows the data received from the parent node to be relayed to the child node. When the transmission slot finishes, the transceiver 13 terminates data transmission, and then, the sleep controller 22 retains the transceiver 13 in the sleep state. Also, the relay data stored in the relay data storage 15 is erased. Thereafter, the wireless communication device 1 stands by until a slot group 8 for downlink starts.

In step S6, the transceiver 13 receives data. Specifically, when the slot group 8 for downlink starts, the sleep controller 22 wakes up the transceiver 13, and then, the transceiver 13 initiates data reception. This allows the transceiver 13 to receive data from a downstream wireless node having a rank value 8. When the slot group 8 for downlink finishes, the transceiver 13 terminates data reception, and then, the sleep controller 22 retains the transceiver 13 in the sleep state.

In step S7, the destination node determiner 17 determines a new child node based on the data received by the transceiver 13 in step S6. The method of determining the child node is as described above. As a result, the child node can be updated according to the latest communication state. Thereafter, the wireless communication device 1 stands by until a next frame starts.

Figure 17:
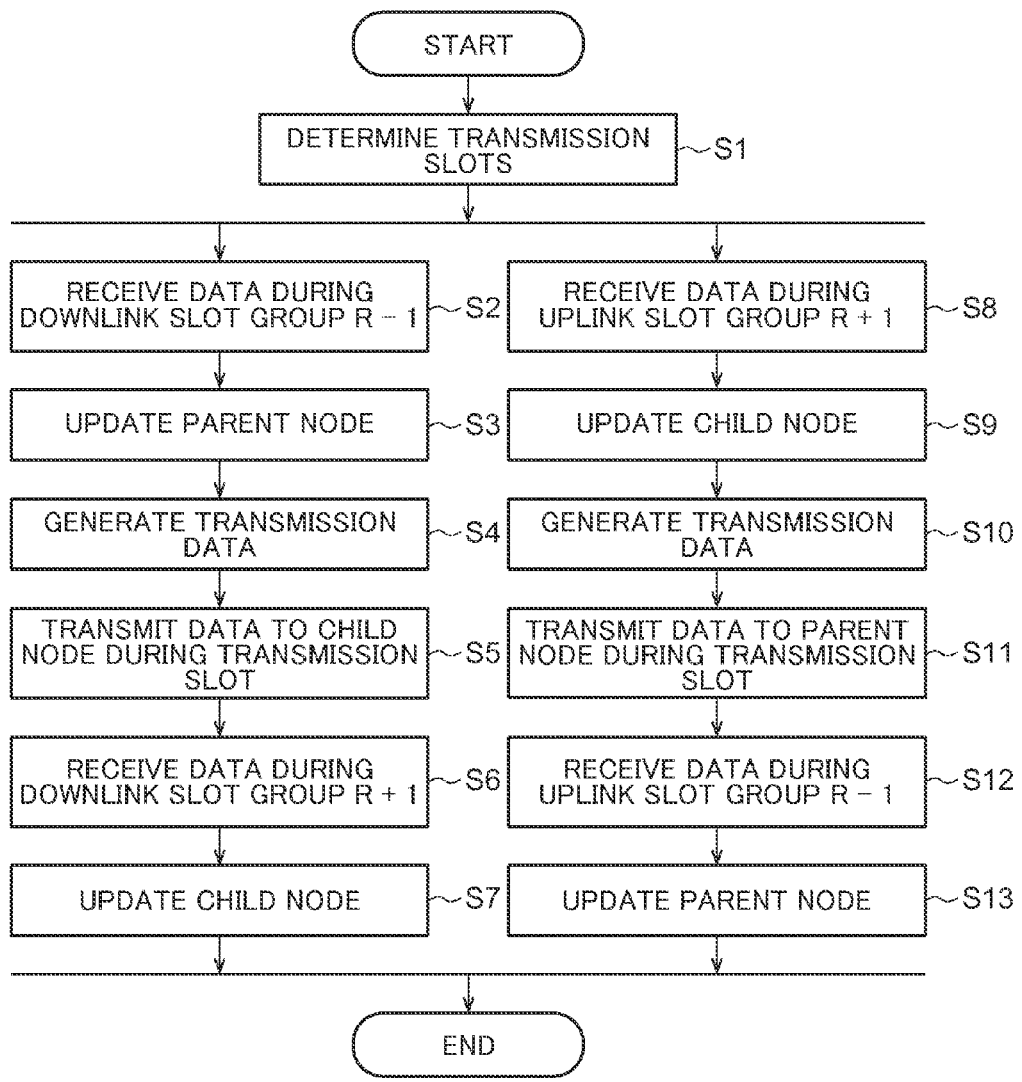
FIG. 17 is a flowchart showing operations of the wireless communication device in a duplex communication frame.
Figure 18:
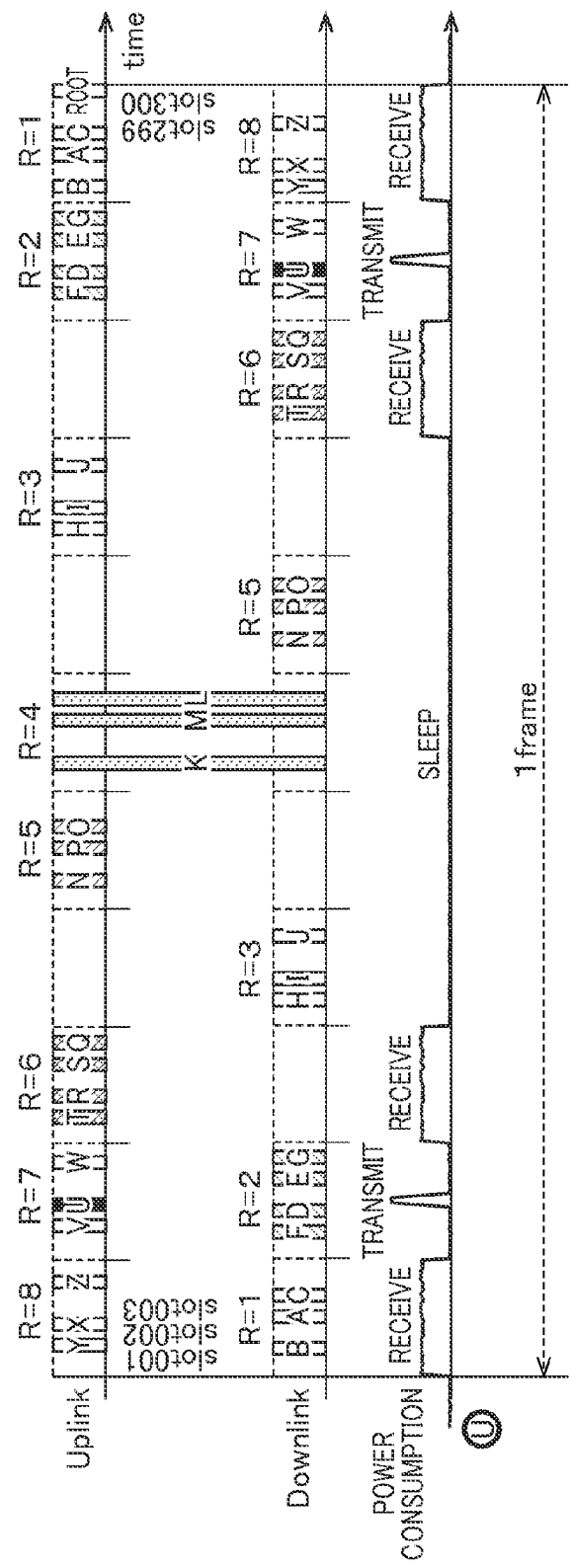
FIG. 18 is a diagram showing an example of operations of the wireless communication device in a duplex communication frame.

Next, operations of the wireless communication device 1 in a duplex communication frame will be specifically described with reference to FIGS. 17 and 18. FIG. 17 is a flowchart showing operations in a duplex communication frame.

In step S1, the transmission slot determiner 20 determines a downlink transmission slot from a slot group 7 for downlink, to which the rank value 7 of the present node is set. Furthermore, the transmission slot determiner 20 determines an uplink transmission slot from a slot group 7 for uplink, to which the rank value 7 of the present node is set.

Next, in step S8, the transceiver 13 receives data during a slot group 8 for uplink. Specifically, when the slot group 8 for uplink starts, the sleep controller 22 wakes up the transceiver 13, and then, the transceiver 13 initiates data reception. This allows the transceiver 13 to receive data from a downstream wireless node having a rank value 8. With the data received by the transceiver 13, a destination node thereof is determined by the destination determiner 14, and the data transmitted from the child node to the present node is stored in the relay data storage 15. When the slot group 8 for uplink finishes, the transceiver 13 terminates data reception, and then, the sleep controller 22 retains the transceiver 13 in the sleep state.

In step S9, the destination node determiner 17 determines a new child node based on the data received by the transceiver 13 in step S8. The method of determining the child node is as described above. As a result, the child node can be updated according to the latest communication state.

In step S10, the transmission data generator 16 generates the transmission data based on the relay data stored in the relay data storage 15. The method of generating the transmission data is as described above. Thereafter, the wireless communication device 1 stands by until the uplink transmission slot determined in step S1 starts.

In step S11, the transceiver 13 transmits the transmission data to the parent node. Specifically, when the uplink transmission slot starts, the sleep controller 22 wakes up the transceiver 13, and then, the transceiver 13 initiates transmission of the transmission data. This allows the data received from the child node to be relayed to the parent node. When the transmission slot finishes, the transceiver 13 terminates data transmission, and then, the sleep controller 22 retains the transceiver 13 in the sleep state. Also, the relay data stored in the relay data storage 15 is erased. Thereafter, the wireless communication device 1 stands by until a slot group 6 for uplink starts.

In step S12, the transceiver 13 receives data. Specifically, when the slot group 6 for uplink starts, the sleep controller 22 wakes up the transceiver 13, and then, the transceiver 13 initiates data reception. This allows the transceiver 13 to receive data from an upstream wireless node having a rank value 6. When the slot group 6 for uplink finishes, the transceiver 13 terminates data reception, and then, the sleep controller 22 retains the transceiver 13 in the sleep state.

In step S13, the destination node determiner 17 determines a new parent node based on the data received by the transceiver 13 in step S12. The method of determining the parent node is as described above. As a result, the parent node can be updated according to the latest communication state. Thereafter, the wireless communication device 1 stands by until the slot group 6 for downlink starts.

When the slot group 6 for downlink starts, the processing of steps S2 to S7 is performed. The steps S2 to S7 are the same as the operations in the simplex communication frame.

As described above, by setting uplink and downlink transmission intervals according to data volume to be transmitted, the wireless communication device 1 and system according to the embodiment can meet a required transmission frequency while reducing a frequency of uplink transmission having large data volume, thereby reducing power consumption.

Moreover, in the wireless communication system, an earlier slot in a frame is allocated to a wireless node located earlier in a pathway of data communication, thereby shortening a data transfer time to within one frame. Furthermore, the wireless communication device can automatically achieve the slot allocation as described above.

Note that, in the above description, it has been assumed that transmission in the first direction is uplink transmission and transmission in the second direction is downlink transmission. However, when data volume for uplink transmission is smaller than data volume for downlink transmission, the directions may be vice versa. In this case, preferably, uplink transmission is performed for every frame and downlink transmission is performed for every M frames.

Figure 19:
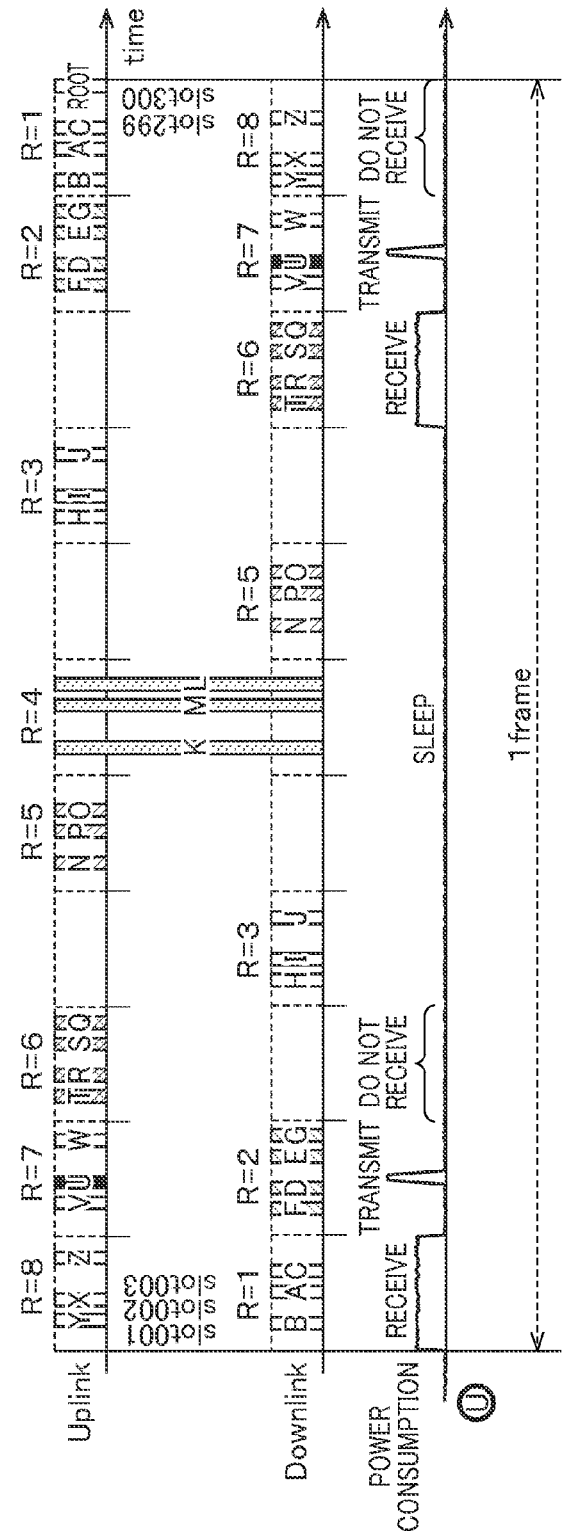
FIG. 19 is a diagram showing another example of operations of the wireless communication device in the duplex communication frame.

Also, as shown in FIG. 19, in the duplex communication frame, the transceiver 13 may not perform the reception processing (step S6) during a slot group R+1 for downlink. In this case, updating the child node may be performed based on the data received in the reception processing (step S8) during a slot group R+1 for uplink.

Similarly, the transceiver 13 may not perform the reception processing (step S12) during a slot group R−1 for uplink in the duplex communication frame. In this case, updating the parent node may be performed based on data received in the reception processing (step S2) during a slot group R−1 for downlink.

Figure 20:
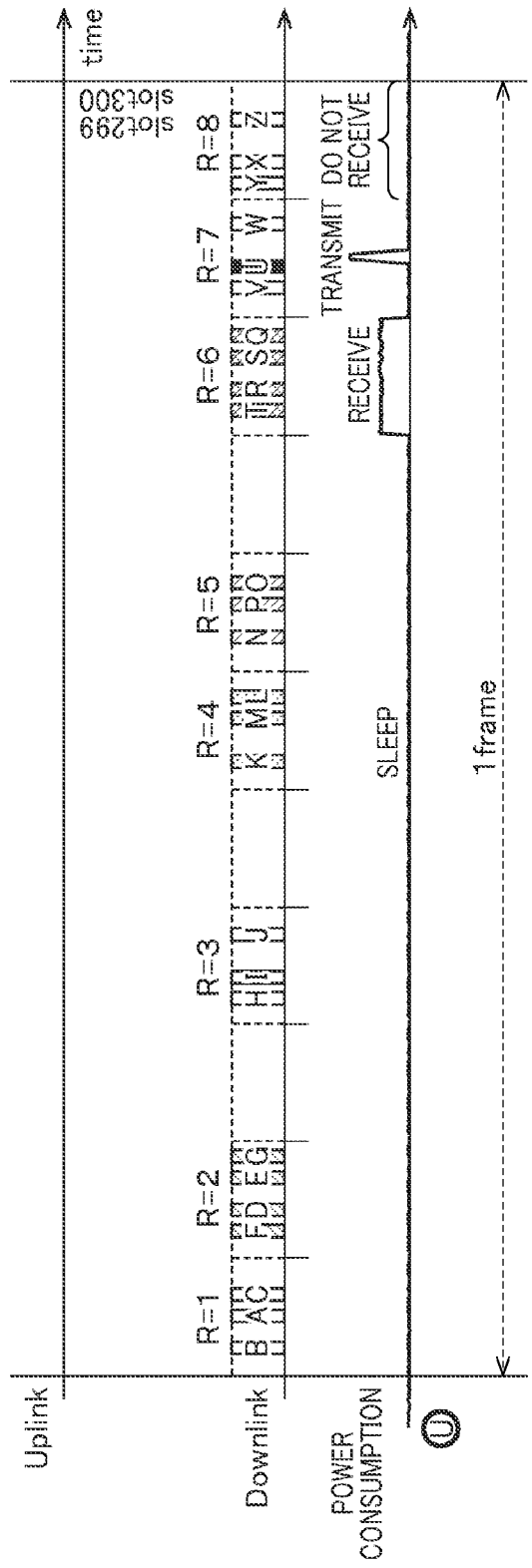
FIG. 20 is a diagram showing another example of operations of the wireless communication device in a simplex communication frame.

Also, as shown in FIG. 20, in a simplex communication frame, the transceiver 13 may not perform the reception processing (step S6) during the slot group R+1 for downlink. In this case, preferably, updating the child node is performed not in the simplex communication frame but in the duplex communication frame.

Figure 21:
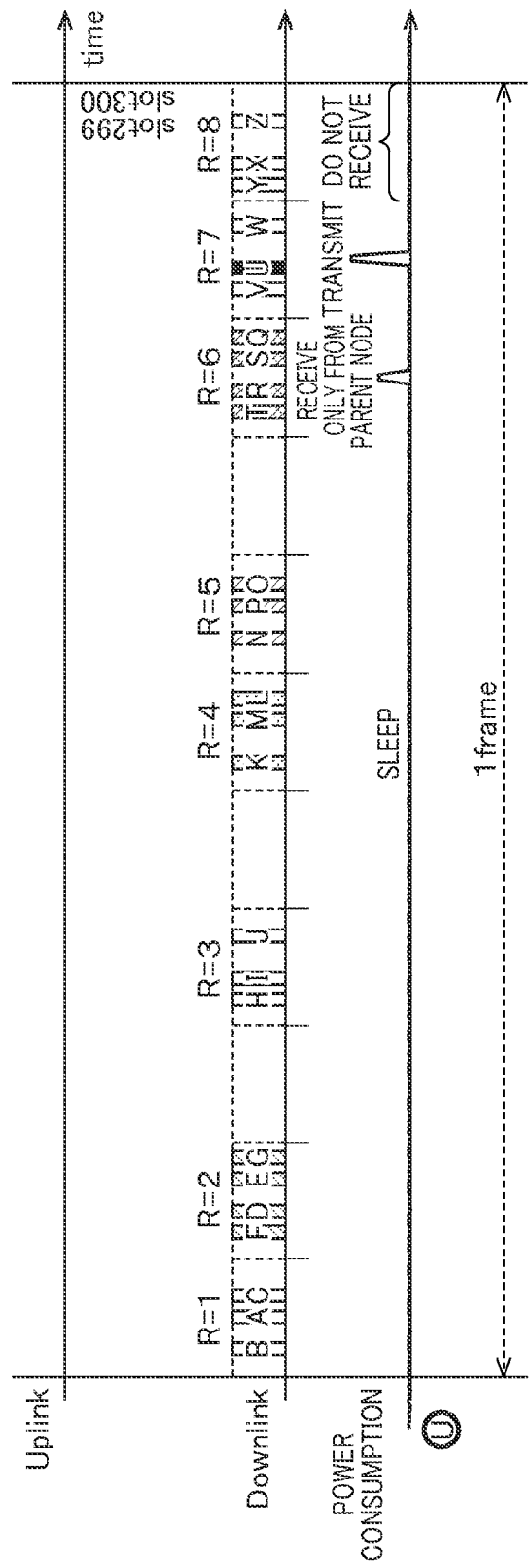
FIG. 21 is a diagram showing another example of operations of the wireless communication device in the simplex communication frame.

Furthermore, as shown in FIG. 21, in the simplex communication frame, the transceiver 13 may alternatively perform reception processing only during a transmission slot of the parent node, instead of performing the reception processing during the slot group R−1 for downlink (step S2). In this case, preferably, updating the parent node is performed not in the simplex communication frame but in the duplex communication frame.

As described above, reducing the interval where the transceiver 13 performs reception processing and increasing the interval of the sleep state allow for further saving the power of the wireless communication device 1 and system.
(Second Embodiment)

Next, a wireless communication device and system according to a second embodiment will be described with reference to FIGS. 21 to 25. In this embodiment, a wireless communication device 1 has a plurality of operation states in a simplex communication frame. The operation states transit from one state to another depending on success or failure of reception. The other configurations are the same as those in the first embodiment. Operations of the wireless communication device 1 in a simplex communication frame will be described below.

Figure 22:
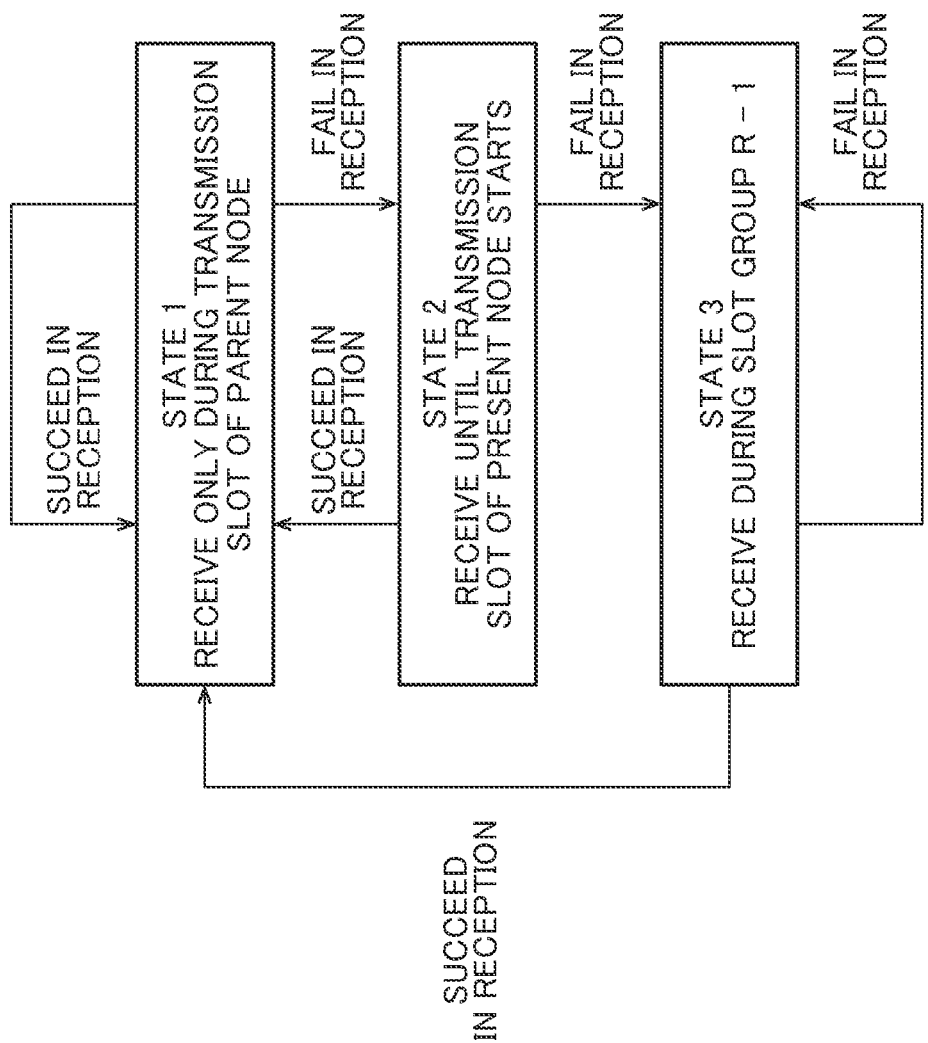
FIG. 22 is a state transition diagram showing operation states of a wireless communication device according to a second embodiment.

FIG. 22 is a state transition diagram showing transition among operation states of the wireless communication device 1 according to the embodiment in a simplex communication frame. As shown in FIG. 22, the wireless communication device 1 has three operation states of states 1 to 3. Among the respective states, a transceiver 13 has different timings for performing reception processing.

As shown in FIG. 21, state 1 is an operation state where the transceiver 13 receives data only during a transmission slot of a parent node. In state 1, the parent node and a child node are not updated. In state 1, since an interval, where the wireless communication device 1 is awake, is the shortest (two slots), power consumption of the wireless communication device 1 is minimized.

As shown in FIG. 22, when the transceiver 13 succeeds in reception during the transmission slot of the parent node, the operation state of state 1 continues. That is, the wireless communication device 1 operates in state 1 also in a next simplex communication frame.

However, wireless communication is not always successful due to its nature and may fail because of fading or shadowing. Fading is a phenomenon where reception power drops due to time-dependent variations of wireless signals. This occurs, for example, when wireless signals are weakened due to transfer of a wireless node, and required power relative to noise is no longer obtained. Meanwhile, shadowing is a phenomenon where reception power drops due to an obstacle existing between wireless nodes.

Therefore, as shown in FIG. 22, when the transceiver 13 fails in reception during the transmission slot of the parent node, the operation state transits from state 1 to state 2.

State 2 is an operation state where the transceiver 13 continues reception until a transmission slot of the present node starts. When, in state 1, the wireless communication device 1 has failed in reception at the end of the transmission slot of the parent node, the wireless communication device 1 transits to state 2 without transiting to the sleep state.

Figure 23:
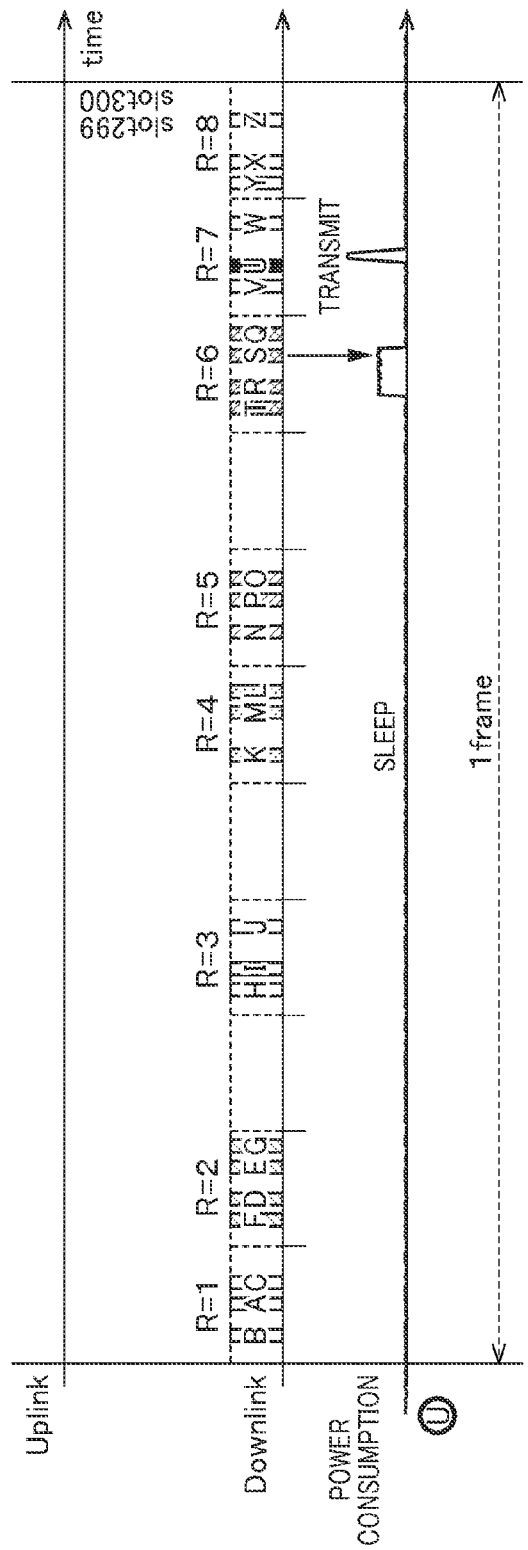
FIG. 23 is a diagram showing operations of the wireless communication device in state 1.

As shown in FIG. 23, when the transceiver 13 has succeeded in reception from another wireless node before the transmission slot of the present node starts, the transceiver 13 terminates reception and goes to sleep. The wireless communication device 1 then determines, as a new parent node, the wireless node from which the wireless communication device 1 has succeeded in reception. In the case of FIG. 23, the parent node is updated from a wireless node R to a wireless node S. Also, transmission data is generated based on data successfully received.

In this manner, when reception succeeds in state 2, the operation state transits from state 2 to state 1. That is, the operation state of the wireless communication device 1 in the next simplex communication frame is state 1.

Figure 24:
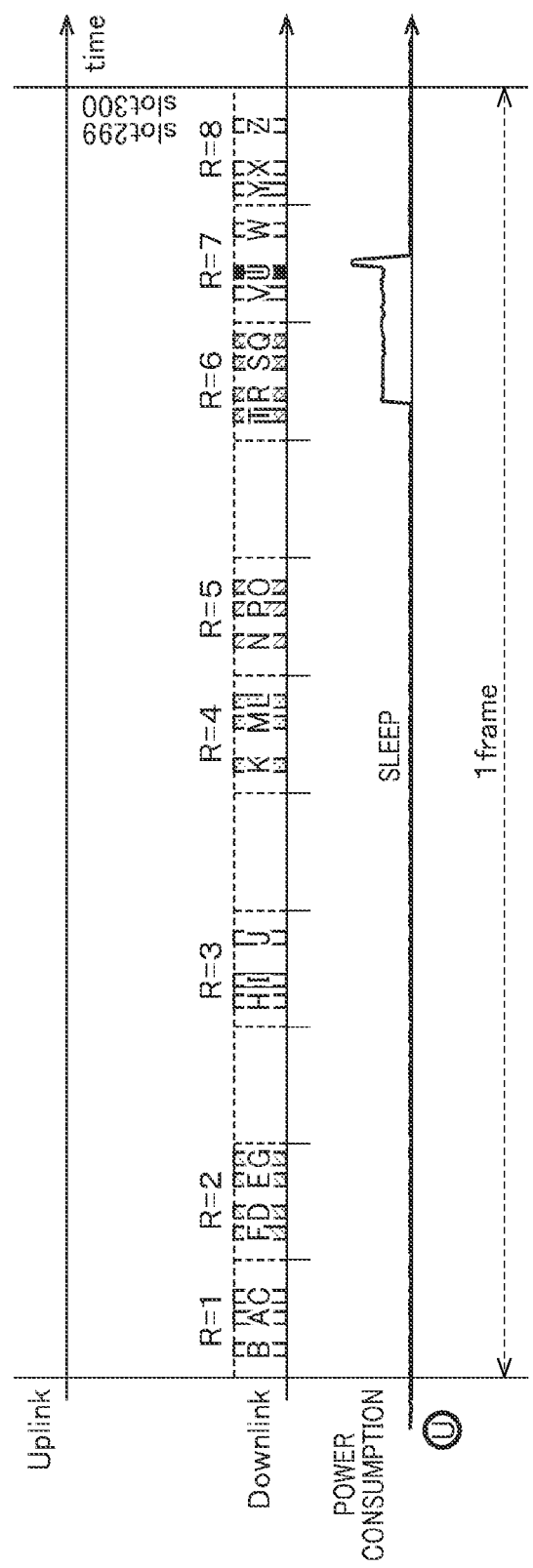
FIG. 24 is a diagram showing operations of the wireless communication device in state 2.

On the other hand, as shown in FIG. 24, when the transceiver 13 has failed in reception from other wireless nodes before the transmission slot of the present node starts, the wireless communication device 1 transmits the transmission data during the transmission slot of the present node. This transmission data does not include relay data from the parent node. In this manner, when reception fails in state 2, the operation state transits from state 2 to state 3. That is, the operation state of the wireless communication device 1 in the next simplex communication frame is state 3.

Figure 25:
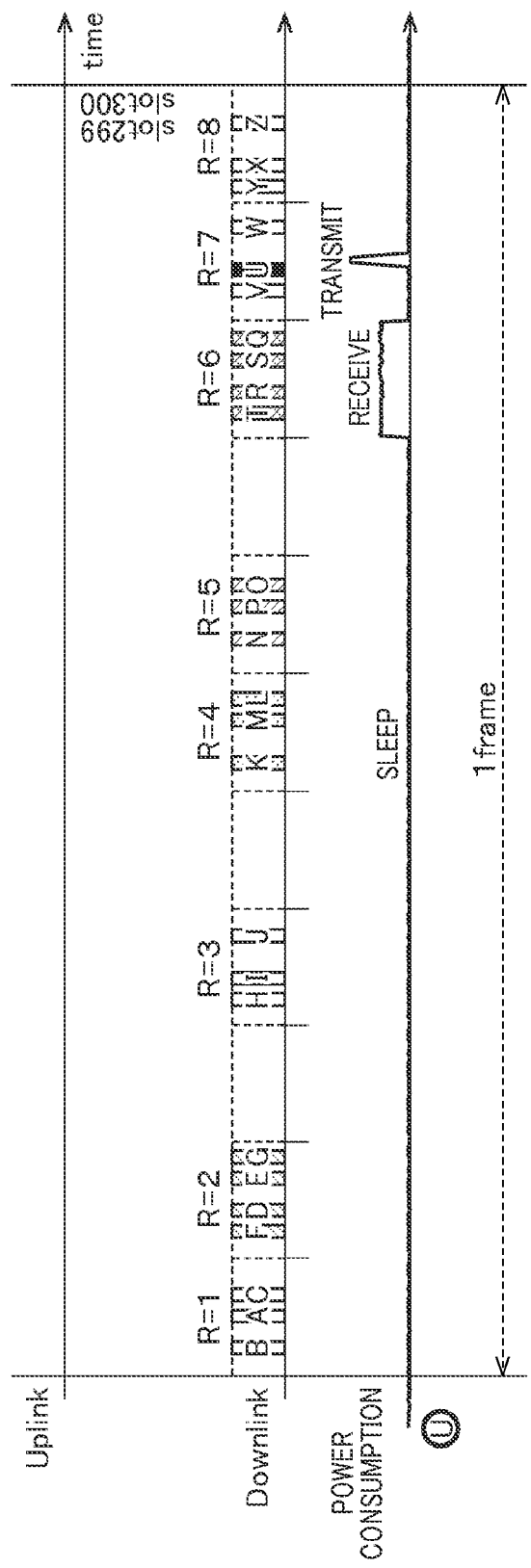
FIG. 25 is a diagram showing operations of the wireless communication device in state 3.

As shown in FIG. 25, state 3 is an operation state where the transceiver 13 receives data during a slot group including the transmission slot of the parent node, namely, a slot group R–1 for downlink.

In state 3, when the transceiver 13 has succeeded in reception from other wireless nodes in the slot group R–1, the wireless communication device 1 determines the new parent node from among the wireless nodes from which the wireless communication device 1 has succeeded in reception. Also, the transmission data is generated based on the data received from the new parent node.

In this manner, when reception succeeds in state 3, the operation state transits from state 3 to state 1. That is, the operation state of the wireless communication device 1 in the next simplex communication frame is state 1.

On the other hand, when the transceiver 13 has failed in reception from other wireless nodes in the slot group R–1, the wireless communication device 1 transmits the transmission data during the transmission slot of the present node. This transmission data does not include the relay data from the parent node. In this manner, when the reception fails in state 3, the operation state of state 3 continues. That is, the operation state of the wireless communication device 1 in the next simplex communication frame is state 3.

Note that, in state 3, the transceiver 13 may perform the reception operation during a plurality of slot groups or the whole frame, not only during the slot group R–1, and determine the new parent node.

As described above, the wireless communication device 1 according to the embodiment continues operation in state 1 when in a preferable communication state. This allows for reducing power consumption of the wireless communication device 1. Alternatively, even when the reception fails, operating in state 2 or state 3 allows for determining the new parent node, thereby retaining communication.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. A wireless communication device comprising:
a transceiver configured to transmit and receive data and transmit the data to a first node in a first direction, and transmit the data to a second node different from the first node in a second direction, and
a timer configured to determine a timing for the transceiver to transmit the data in each of the first direction and the second direction such that a transmission interval in the first direction is longer than a transmission interval in the second direction,
wherein the timer is implemented by a processor and the processor is configured to
determine whether a current frame is a duplex communication frame in which transmission in the first direction and the second direction is performed, or a simplex communication frame in which transmission in the second direction is performed; and
determine a transmission slot, in which the transceiver transmits the data, from the frame time-divided into a plurality of slots, based on a rank value of a present node corresponding to the number of hops to a root node.

2. The device according to claim 1, wherein data volume transmitted in the first direction is larger than data volume transmitted in the second direction.

3. The device according to claim 1, wherein the transmission intervals in the first direction and the second direction are set according to data volume transmitted in the first direction and the second direction.

4. The device according to claim 1, wherein transmission in the first direction is uplink transmission, and transmission in the second direction is downlink transmission.

5. The device according to claim 1, wherein the transceiver is configured to transmit the data in the first direction for every M frames (where M is an integer of 2 or more) and in the second direction for every frame.

6. The device according to claim 1, wherein a plurality of slot groups including a plurality of consecutive slots is set to the frame,
rank values different from each other are set to the respective slot groups, and
the processor is configured to determine the transmission slot from among slots included in a slot group to which the rank value of the present node is set.

7. The device according to claim 6, wherein rank values for transmission in the first direction and rank values for transmission in the second direction are set to the frame.

8. The device according to claim 7, wherein a larger rank value for transmission in the first direction is set to an earlier slot group.

9. The device according to claim 7, wherein a smaller rank value for transmission in the second direction is set to an earlier slot group.

10. The device according to claim 7, wherein, in the duplex communication frame, a rank value R+1 for the first direction and a rank value R−1 for the second direction are set to different slot groups.

11. The device according to claim 6, wherein, in the simplex communication frame, the transceiver receives the data during a slot group to which a rank value smaller by 1 than a rank value of the present node is set.

12. The device according to claim 6, wherein, in the simplex communication frame, the transceiver receives the data during a transmission slot of a parent node.

13. The device according to claim 12, wherein, when the transceiver has failed in reception of the data in the transmission slot of the parent node, the transceiver continues reception of the data until a transmission slot of the present node starts.

14. The device according to claim 13, wherein, when the transceiver has failed in reception of the data before the transmission slot of the present node starts, in a next simplex communication frame, the transceiver receives the data during a slot group including the transmission slot of the parent node.

15. The device according to claim 1, further comprising a sleep controller configured to halt transmission and reception of the data by the transceiver.

16. A wireless communication system comprising: the device according to claim 1; and a concentrator, implemented by a computer, configured to concentrate the data from the device.

* * * * *